(12) United States Patent
Edge et al.

(10) Patent No.: US 12,520,139 B2
(45) Date of Patent: Jan. 6, 2026

(54) SIGNALING AND PROCEDURES FOR SUPPORTING POSITIONING REFERENCE UNITS

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 324 days.

(21) Appl. No.: 18/312,569

(22) Filed: May 4, 2023

(65) Prior Publication Data

US 2023/0362641 A1 Nov. 9, 2023

Related U.S. Application Data

(60) Provisional application No. 63/382,211, filed on Nov. 3, 2022, provisional application No. 63/378,858, filed on
(Continued)

(51) Int. Cl.
*H04W 12/06* (2021.01)
*H04W 12/63* (2021.01)
(Continued)

(52) U.S. Cl.
CPC ........... *H04W 12/06* (2013.01); *H04W 12/63* (2021.01); *H04W 12/69* (2021.01); *H04W 60/04* (2013.01)

(58) Field of Classification Search
CPC ...... H04W 12/06; H04W 12/63; H04W 12/69
See application file for complete search history.

(56) References Cited

U.S. PATENT DOCUMENTS

| 10,869,315 B2 | 12/2020 | Cheng et al. |
| 2013/0080769 A1* | 3/2013 | Cha ........................ G06F 21/575 726/3 |
| 2024/0073853 A1 | 2/2024 | Fischer et al. |

FOREIGN PATENT DOCUMENTS

| EP | 3923501 A1 | 12/2021 |
| WO | 2019168908 A1 | 9/2019 |
| WO | WO-2020164514 A1 | 8/2020 |

OTHER PUBLICATIONS

3GPP TS 23.273, 3rd Generation Partnership Project, Technical Specification Group Services and System Aspects, 5G System Location Services (LCS) (Release 16), V0.0.0, Jan. 2019, 11 Pages.
(Continued)

*Primary Examiner* — Kathy W Wang-Hurst
(74) *Attorney, Agent, or Firm* — Weaver Austin Villeneuve & Sampson LLP

(57) ABSTRACT

Disclosed are techniques for supporting positioning. In an aspect, a positioning reference unit (PRU) sends and a location server receives an association request for the PRU. The location server authenticates the PRU and sends to the PRU an association accept indicating an acceptance of association and conditions for performing another association with the location server if the PRU is authenticated, or indicates a rejection of the association if the PRU is not authenticated. The association accept may include an identifier for the location server for the PRU for updating the association with the location server and/or identifiers for one or more additional location servers with which the PRU is to perform separate association. The location server may send to the PRU a disassociation request indicating the PRU is no longer associated and optionally an identifier for another location server with which the PRU should associate.

28 Claims, 21 Drawing Sheets

Related U.S. Application Data on Oct. 8, 2022, provisional application No. 63/338,879, filed on May 5, 2022.

(51) Int. Cl.
*H04W 12/69* (2021.01)
*H04W 60/04* (2009.01)

(56) References Cited

OTHER PUBLICATIONS

Cewit, et al., "Discussion on Positioning Enhancements for Release 17", 3GPP TSG RAN WG1 103-e, R1-2008718, 3rd Generation Partnership Project, Mobile Competence Centre, 650, Route Des Lucioles, F-06921 Sophia-Antipolis Cedex, France, vol. RAN WG1, No. e-meeting, Oct. 16, 2020-Nov. 13, 2020, Oct. 17, 2020, XP051940317, 8 Pages, p. 3,4, paragraphs 2.3 and 5.

Ericsson: "WF on Positioning Transport for NG-RAN Hosting E-UTRA", 3GPP TSG-RAN WG3 #97, R3-173373_WF, 3rd Generation Partnership Project, Mobile Competence Centre, 650, Route Des Lucioles, F-06921 Sophia-Antipolis Cedex, France, vol. RAN WG3, No. Berlin, Germany, Aug. 21, 2017-Aug. 25, 2017 Aug. 25, 2017, XP051330664, 2 Pages, Section 2.

Huawei et al, "Scope Revision of Rel-17 WI on NR Positioning Enhancements", 3GPP TSG RAN Meeting #91-e, RP-210568, 3rd Generation Partnership Project, Mobile Competence Centre, 650, Route Des Lucioles, F-06921 Sophia-Antipolis Cedex, France, vol. TSG RAN, No. Electronic Meeting, Mar. 16, 2021-Mar. 26, 20210 Mar. 15, 2021, XP051985931, 11 Pages, p. 5.

International Search Report and Written Opinion—PCT/US2022/070471—ISA/EPO—Sep. 1, 2022 (2103739WO).

Moderator (Ericsson): "Summary #3 for AI 8.5.3 Accuracy Improvements for DL-AoD Positioning", 3GPP TSG-RAN WG1 Meeting #103-e, R1-2102093, 3rd Generation Partnership Project, Mobile Competence Centre, 650, Route Des Lucioles, F-06921 Sophia-Antipolis Cedex, France, vol. RAN WG1, No. e-meeting, Jan. 25, 2021-Feb. 5, 2021, Feb. 5, 2021, XP051977688, 83 Pages, pp. 50-52.

Qualcomm Incorporated: "Comparison of 5GC-LMF and RAN-LMC Based Positioning", 3GPP Draft, R3-195824_(Local LMF Benefits), 3GPP TSG RAN WG3 Meeting #105bis, 3rd Generation Partnership Project (3GPP), Mobile Competence Centre, 650, Route Des Lucioles, F-06921 Sophia-Antipolis Cedex, France vol. RAN WG3, No. Chongqing, China, Oct. 14, 2019-Oct. 18, 2019, Oct. 4, 2019 (Oct. 4, 2019), XP051810037, 14 Pages, Section 2.3, figures 6, 7, p. 12, paragraph 3. 1, figure 6.

Huawei et al: "Solution for KI#7: Support of Positioning Reference Units and Reference UEs", 3GPP TSG-WG SA2 Meeting #150E, S2-2203305, Revision of S2-2202730r01, 3rd Generation Partnership Project, Mobile Competence Centre, 650, Route Des Lucioles, F-06921 Sophia-Antipolis Cedex, France, vol. SA WG2, No. e-meeting, Elbonia, Apr. 6, 2022-Apr. 12, 2022, Apr. 13, 2022, 11 Pages, XP052136168, Chapter 6.X.3 Procedures.

Interdigital Inc: "Discussion on Supporting Positioning Reference Units", 3GPP RAN WG2 Meeting #116bis-e, R2-2201191, 3rd Generation Partnership Project, Mobile Competence Centre, 650, Route Des Lucioles, F-06921 Sophia-Antipolis Cedex, France, vol. RAN WG2, No. Electronic, Nov. 7, 2022-Jan. 25, 2022, Jan. 11, 2022, 4 Pages, XP052094293, Chapter 2 Discussion.

International Search Report and Written Opinion—PCT/US2023/021217—ISA/EPO—Aug. 24, 2023.

Qualcomm Incorporated: "Signalling and Procedures for Supporting Positioning Reference Units", 3GPP TSG-RAN WG3 Meeting #113-e, R3-213399, 3rd Generation Partnership Project, Mobile Competence Centre, 650, Route Des Lucioles, F-06921 Sophia-Antipolis Cedex, France, vol. RAN WG3, No. Electronic Meeting, Aug. 16, 2021-Aug. 27, 2021, Aug. 5, 2021, 16 Pages, XP052032700, Chapter 5.1.2 Solution 2: PRU Registration using Supplementary Services, Figure 5.

Nokia (Rapporteur) et al., "NR Positioning Stage 2 Corrections", RP-202775, R2-2010882, 3rd Generation Partnership Project, Mobile Competence Centre, 650, Route Des Lucioles, F-06921 Sophia-Antipolis Cedex, France, vol. RAN WG2, No. Electronic, Nov. 2, 2020-Nov. 13, 2020 Dec. 3, 2020, XP051964854, 24 Pages, Sections 5.3.3 and 8.10323.

Huawei, et al., "Enhancement to Mitigate gNB and UE Rx/Tx Timing Error", 3GPP TSG RAN WG1 Meeting #104-e, R1-2100195, E-meeting, Jan. 25-Feb. 5, 2021, Jan. 19, 2021, 9 Pages.

\* cited by examiner

SIGNALING AND PROCEDURES FOR SUPPORTING POSITIONING REFERENCE UNITS

RELATED APPLICATIONS

This application claims the benefit of U.S. Provisional Application No. 63/338,879, filed May 5, 2022, entitled "SIGNALING AND PROCEDURES FOR SUPPORTING REFERENCE LOCATION DEVICES", U.S. Provisional Application No. 63/378,858, filed Oct. 8, 2022, entitled "SIGNALING AND PROCEDURES FOR SUPPORTING REFERENCE LOCATION DEVICES", and U.S. Provisional Application No. 63/382,211, filed Nov. 3, 2022, entitled "SIGNALING AND PROCEDURES FOR SUPPORTING REFERENCE LOCATION DEVICES", all of which are assigned to the assignee hereof and incorporated herein by reference in their entirety.

BACKGROUND

1. Background Field

Aspects of the disclosure relate generally to wireless communications and location of wireless devices.

2. Relevant Background

Wireless communication systems have developed through various generations, including a first-generation analog wireless phone service (1G), a second-generation (2G) digital wireless phone service (including interim 2.5G and 2.75G networks), a third-generation (3G) high-speed data, Internet-capable wireless service and a fourth-generation (4G) service (e.g., Long Term Evolution (LTE) or WiMAX). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Location of wireless devices, including objects or entities associated with wireless devices, that are accessing a 4G, 5G (or later 6G) wireless network may be important for many applications. These can include: locating the user of an emergency call; finding people (e.g. relatives, friends, employees); tracking objects and assets; locating vehicles, ships, airplanes and drones; and coordinating and managing the movement of objects, machinery, tools and packages in a factory or warehouse. Methods for locating wireless devices can make use of a location server in a wireless network where the location server assists with locating wireless devices by providing location related assistance data to the wireless devices and/or receives location related measurements for wireless device and calculates locations of the wireless devices.

SUMMARY

Disclosed are techniques for supporting positioning. In an aspect, a positioning reference unit (PRU) sends and a location server receives an association request for the PRU. The location server authenticates the PRU and sends to the PRU an association response indicating an acceptance of association and conditions for performing another association with the location server if the PRU is authenticated and indicates a rejection of the association if the PRU is not authenticated. The association response may include an identifier for the location server for the PRU for updating the association with the location server and/or identifiers for one or more additional location servers with which the PRU is to perform separate association. The location server may send to the PRU an association modification indicating new conditions for performing association updates, routing identifiers for one or more additional location servers or a disassociation of the PRU with the location server.

In one implementation, a method performed by a location server for supporting positioning in a wireless network, includes receiving an association request for a positioning reference unit (PRU); authenticating the PRU; and sending an association response to the PRU, the association response indicating an acceptance of association and conditions for performing another association with the location server if the PRU is authenticated, and the association response indicating a rejection of the association if the PRU is not authenticated.

In one implementation, a location server configured for supporting positioning in a wireless network, includes one or more transceivers; one or more memories; and one or more processors communicatively coupled with the one or more transceivers and the one or more memories, wherein the one or more processors are configured to: receive, via the external interface, an association request for a positioning reference unit (PRU); authenticate the PRU; and send, via the external interface, an association response to the PRU, the association response indicating an acceptance of association and conditions for performing another association with the location server if the PRU is authenticated, and the association response indicating a rejection of the association if the PRU is not authenticated.

In one implementation, a method performed by a positioning reference unit (PRU) for supporting positioning in a wireless network, includes sending an association request to a location server; receiving an association response from the location server, the association response indicating an acceptance of association and conditions for performing another association with the location server or the association response indicating a rejection of the association.

In one implementation, a positioning reference unit (PRU) configured for supporting positioning in a wireless network, includes one or more transceivers; one or more memories; one or more processors communicatively coupled with the one or more transceivers and the one or more memories, wherein the one or more processors are configured to: send an association request to a location server via the one or more transceivers; receive an association response from the location server via the one or more transceivers, the association response indicating an acceptance of association and conditions for performing another association with the location server or the association response indicating a rejection of the association.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 2A and 3B are simplified block diagrams of several sample aspects of components that may be employed in a user equipment (UE) and a network entity, respectively, and configured to communications as taught herein.

DETAILED DESCRIPTION

Figure 1A:
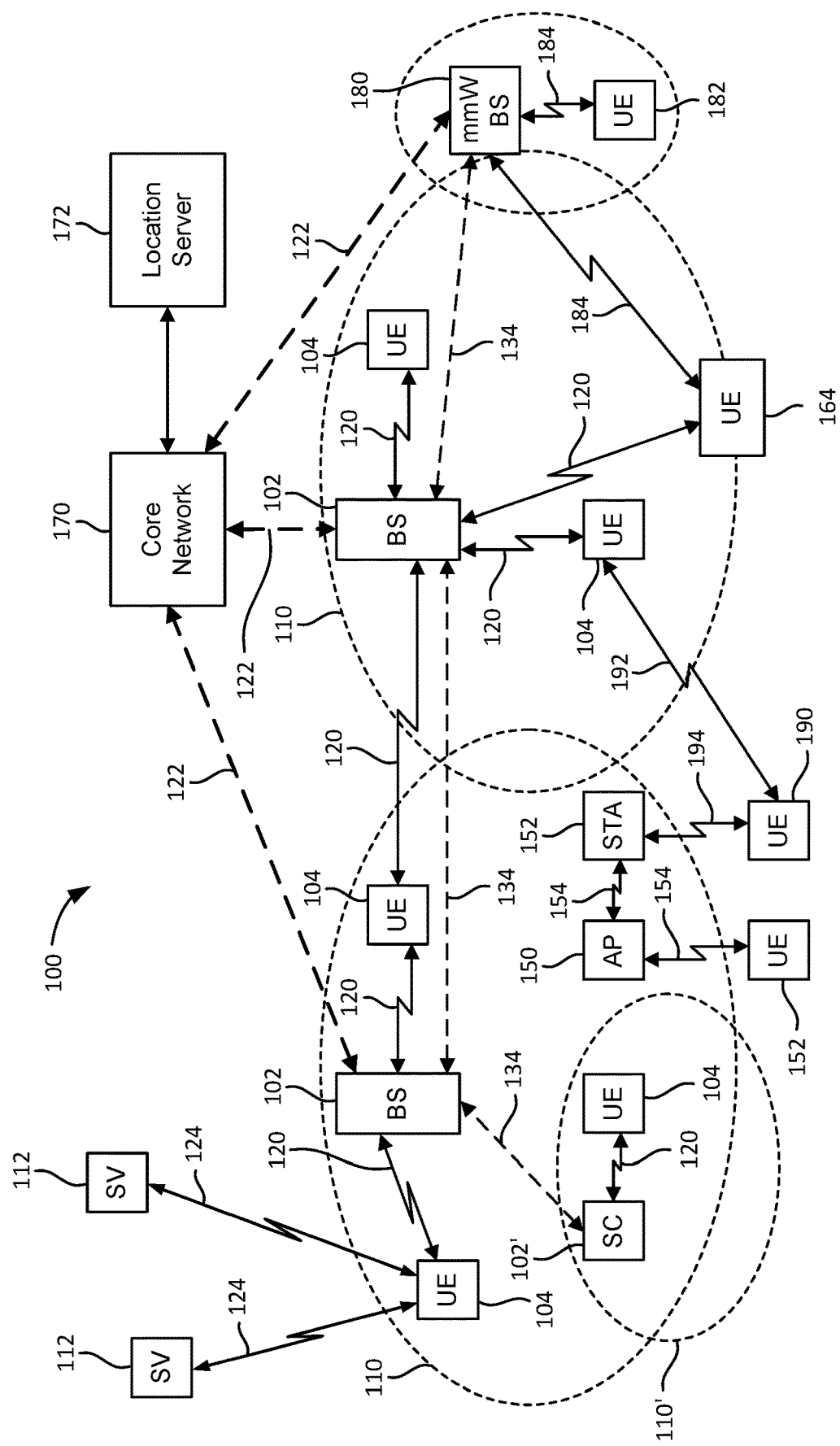
FIG. 1A illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

One way to achieve improvements is through the use of positioning reference units (PRUs), which may assist in positioning procedures. PRUs may have known locations and can perform positioning measurements (e.g., RSTD, RSRP, Rx-Tx time difference, etc.) related to a target UE and report these measurements to a location server. In addition, the PRU may transmit UL-PRS (e.g., SRS) to enable TRPs to measure and report uplink positioning measurements from devices (i.e. the PRUs) at known location (e.g., RTOA, UL-AoA, gNB Rx-Tx time difference, etc.). The PRU's actual measurements can be compared with the measurements that would be expected at the PRU's known location. Similarly, the uplink measurements from the TRPs can be compared with the measurements that would be expected at the TRPs from the transmitted signal(s) of the PRU at the known location. These comparisons can be used to determine correction terms (e.g. such as corrections for internal delays in TRPs and base stations, timing synchronization of TRPs and base stations, and corrections for propagation and transmission delays related to TRP and base station antennas and antenna feeds). The correction terms may enable more accurate location of nearby UEs. For example, downlink and/or uplink location measurements for other UEs can be corrected based on the previously determined correction terms. The correction terms may indicate calibration errors (e.g., group delay errors in transmit and receive chains of UEs and TRPs, time synchronization errors between transmission reception points (TRPs), etc.).

A PRU may be, for example a device that may be used to obtain location related information for nodes in a Radio Access Network (RAN) (such as a Next Generation RAN (NG RAN)) unrelated to specific target UEs. Another example of a PRU may be a Reference UE, which is a device similar to or the same as normal UE, that may be used to obtain location related information for one or more other target UEs. Other examples of a PRU may include a Roadside Unit (RSU), which is a device that may be used to provide connectivity or positioning support and/or information services to nearby (e.g. passing) vehicles, or a Global Navigation Satellite System (GNSS) reference receiver. A PRU also may be referred to as reference location device (RLD).

One or more PRUs with known location(s) may be used to assist or enable obtaining location(s) of one or more target UEs. For example, the one or more PRUs may obtain location measurements of signals (e.g. UL SRS or SL-PRS) transmitted by the one or more target UEs, and/or the one or more target UEs may obtain location measurements of signals (e.g., DL PRS or SL-PRS) transmitted by the one or more PRUs. The location measurements may then be used to determine the location(s) of the one or more target UEs by a PRU, one of the one or more target UEs or by a location server such as an LMF. As an example, the one or more target UEs may each be part of a different vehicle (e.g. a car, truck or bus) and the one of more PRUs may be RSUs. Determining the location(s) of the one or more target UEs may then be possible with low latency (e.g. less than 100 ms) and high accuracy (e.g. with location errors of less than a meter).

Support for PRUs may be provided by treating the PRUs the same as normal UEs from an architectural perspective. The PRUs may be enabled to support positioning functions of a normal target UE and/or may be enabled to support some positioning functions of an NG RAN node. The support for PRUs may avoid impact to network entities, such as an Access and mobility Management Function (AMF), NG RAN node, Unified Data Management (UDM) or any existing non-eLCS (enhanced Location Services) interface or reference point. Support may be provided through use of an existing Supplementary Service protocol, such as defined in Technical Specification (TS) 24.080 for the Third Generation Partnership Project (3GPP), to enable interaction between a PRU and a location server, such as a Location Management Function (LMF) that is transparent to other entities.

FIG. 1A illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core network (5GCN or 5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum.

EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1A, one or more Earth orbiting satellite positioning system (SPS) space vehicles (SVs) 112 (e.g., satellites) may be used as an independent source of location information for any of the illustrated UEs (shown in FIG. 1A as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1A, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 1B:
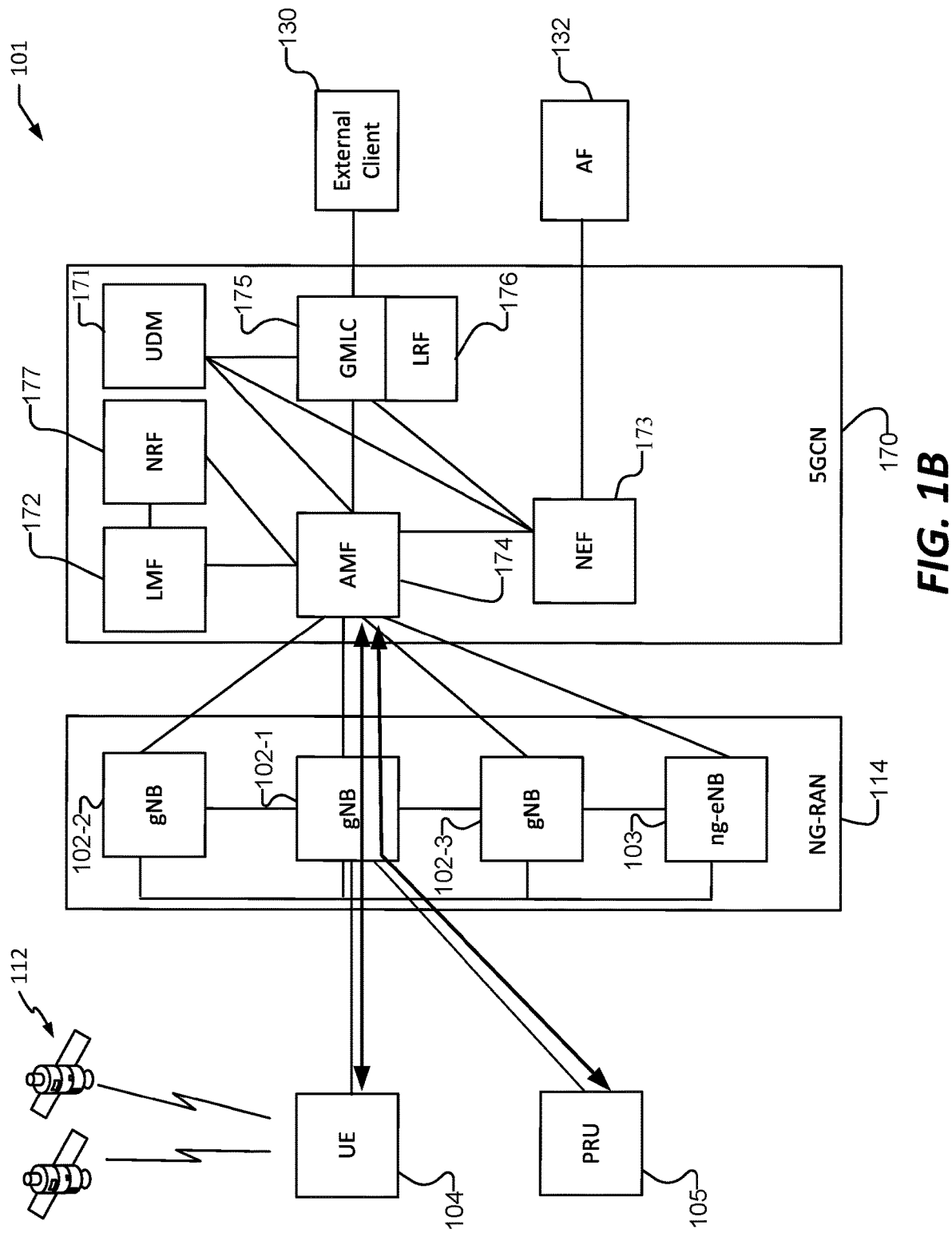
FIG. 1B illustrates a high-level system architecture of a wireless communications system in accordance with an aspect of the disclosure.

FIG. 1B shows a communication system 101 based on a non-roaming 5G NR network to support positioning reference units (PRUs), such as a reference location device (RLD), reference User Equipment (UE), Roadside Unit (RSU), or Global Navigation Satellite System (GNSS) reference receiver as discussed herein. FIG. 1B illustrates an exemplary architecture based on 5G of the wireless communications system 100 shown in FIG. 1A including the core network 170, illustrated as a 5GCN in communication with an external client 130 and Application Function (AF) 132, and a Next Generation Radio Access Network (NG-RAN) 114 including base stations (BSs) 102 sometimes referred to as New Radio (NR) NodeBs or gNBs 102-1, 102-2, 102-3, and a next-generation evolved NodeB (ng-eNB) 103. In the communication system 101, the core network 170 that is in communication with the UE 104 and PRU 105 via the NG-RAN 114 is part of a Public Land Mobile Network (PLMN). The architecture of a gNB 102 may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB 102. A 5G network may also be referred to as a New Radio (NR) network; NG-RAN 114 may be referred to as an NR RAN or a 5G RAN; and 5GCN 170 may be referred to as a Next Generation (NG) Core network (NGC). The communication system 100 may further utilize information from space vehicles (SVs) 112 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1B shows a serving gNB 102-1 for the target UE 104 and neighbor gNBs 102-2, 102-3, and ng-eNB 103. A neighbor gNB 102 may be any gNB 102 which is able to receive and measure uplink (UL) signals transmitted by the target UE 104 and/or is able to transmit a downlink (DL) reference signal (RS), e.g., positioning reference signals (PRS), that can be received and measured by the target UE 104.

Additionally, FIG. 1B shows a PRU 105 coupled to receive signals through the serving gNB 102-1. The PRU 105 may be one or more of several types of devices. For example, the PRU 105 may be a PRU that is used to obtain location related information for nodes in NG-RAN 114, such as gNBs 102 or ng-eNB 103, and that is unrelated to the target UE 104. The PRU 105 may additionally or alternatively be a Reference UE that is used to obtain location related information for the target UE 104. The PRU 105 may additionally or alternative be an RSU or GNSS reference receiver. The PRU 105, for example, may have a known location and may be enabled to perform positioning measurements (e.g., RSTD, RSRP, Rx-Tx time difference, etc.) and report these measurements to a location server, e.g., LMF 172. In addition, the PRU 105 may transmit UL-PRS (e.g., SRS) to enable TRPs, e.g., gNBs 102 or ng-eNB 103, to measure and report uplink positioning measurements from devices at known location (e.g., RTOA, UL-AoA, gNB Rx-Tx time difference, etc.). The actual measurements by PRU 105 may be compared with the measurements that would be expected at the known location of the PRU 105 to determine correction terms for UE 104. Similarly, the uplink measurements from the gNBs 102 can be compared with the measurements that would be expected at the gNBs 102 from the transmitted signal(s) of the PRU 105 at the known location. The downlink and/or uplink location measurements for the UE 104 can then be corrected based on the previously determined correction terms. The correction terms may indicate calibration errors (e.g., group delay errors in transmit and receive chains of the UE 104, gNBs 102, and time synchronization errors between the gNBs 102, etc.).

The PRU 105 may be supported by treating the PRU 105 the same as UE 104 within the architecture. Accordingly, unless stated otherwise, treatment of the UE 104 within the architecture illustrated in FIG. 1B applies to the PRU 105. The PRU 105 may be enabled to support positioning functions of the UE 104 and may be further enabled to support some positioning functions of a gNB 102. The support for PRU 105 may avoid impact to network entities, such as the Access and mobility Management Function (AMF) 174, gNBs 102, Unified Data Management (UDM) 171, or any existing non-eLCS (enhanced Location Services) interface or reference point. Additionally, support may be provided through use of an existing Supplementary Service protocol (e.g., such as the protocol defined in 3GPP TS 24.080) to enable interaction between the PRU 105 and the LMF 172 that is transparent to other entities. A PRU 105 (e.g. an RSU or Reference UE) may be able to support, or assist with, positioning of one or more UEs 104 by transmitting sidelink (SL) positioning reference signals (SL-PRS) (e.g. which may be NR or LTE SL signaling) which are measured by the UEs 104, by receiving and measuring SL-PRS signals transmitted by the UEs 104, and/or by exchanging control messages (e.g. which may be defined for an SL positioning protocol) with the UEs 104 using SL signaling to control and coordinate the positioning of the UEs 104.

Entities in the NG-RAN 114 which transmit DL reference signals (RSs) to be measured by a target UE 104 for a particular location session are referred to generically as "Transmission Points" (TPs) and can include one or more of the serving gNB 102-1, and neighbor gNBs 102-2, 102-3, and ng-eNB 103.

Entities in the NG-RAN 114 which receive and measure UL signals (e.g. an RS) transmitted by a target UE 104 for a particular location session are referred to generically as "Reception Points" (RPs) and can include one or more of the serving gNB 102-1, and neighbor gNBs 102-2, 102-3, and ng-eNB 103.

It should be noted that FIG. 1B provides only a generalized illustration of various components, any or all of which may be utilized as appropriate, and each of which may be duplicated or omitted, as necessary. Specifically, although only one UE 104 and one PRU 105 are illustrated, it will be understood that many UEs and PRUs (e.g., hundreds, thousands, millions, etc.) may utilize the communication system 101. Similarly, the communication system 101 may include a larger or smaller number of SVs 112, gNBs 102-1, 102-2, external clients 130, and/or other components. The illustrated connections that connect the various components in the communication system 101 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1B illustrates a 5G-based network, similar network implementations and configurations may be used for other communication technologies, such as 3G, Long Term Evolution (LTE), also referred to as 4G, and IEEE 802.11 WiFi etc. For example, where a Wireless Local Area Network (WLAN), e.g., IEEE 802.11 radio interface, is used, the UE 104 may communicate with an Access Network (AN), as opposed to an NG-RAN, and accordingly, component 114 is sometimes referred to herein as an AN or as a RAN, denoted by the term "RAN", "(R)AN" or "(R)AN 114". In the case of an AN (e.g. IEEE 802.11 AN), the AN may be connected to a Non-3GPP Interworking Function (N3IWF) (e.g. in 5GCN 170) (not shown in FIG. 1B), with the N3IWF connected to AMF 174.

The target UE 104, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 104 may be a stand-alone device or may be embedded in another device, e.g., a factory tool, that is to be monitored or tracked. Moreover, UE 104 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 104 may include a single entity or may include multiple entities such as in a personal area network where a user may employ audio, video and/or data I/O devices and/or body sensors and a separate wireline or wireless modem. Typically, though not necessarily, the UE 104 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 114 and 5GCN 170), etc. The UE 104 may also support wireless communication using a Wireless Local Area Network (WLAN) which may connect to other networks (e.g. the Internet) using a Digital Subscriber Line (DSL) or packet cable for example. The use of one or more of these RATs may allow the UE 104 to communicate with an external client 130 (e.g. via elements of 5GCN 170 not shown in FIG. 1B, or possibly via a Gateway Mobile Location Center (GMLC) 175), and/or allow the external client 130 to receive location information regarding the UE 104 (e.g., via the GMLC 175).

The UE 104 may enter a connected state with a wireless communication network that may include the NG-RAN 114. In one example, the UE 104 may communicate with a cellular communication network by transmitting wireless signals to, or receiving wireless signals from a cellular transceiver, in the NG-RAN 114, such as a gNB 102-1. A transceiver provides user and control planes protocol terminations toward the UE 104 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 104 may have circuitry and processing resources capable of obtaining location related measurements. Location related measurements obtained by UE 104 may include measurements of signals received from satellite vehicles (SVs) 112 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 102). UE 104 or gNB 102-1 to which UE 104 may send the measurements, may then obtain a location estimate for the UE 104 based on these location related measurements using any one of several position methods such as, for example, GNSS, Assisted GNSS (A-GNSS), Advanced Forward Link Trilateration (AFLT), Angle of Departure (AOD), DL Time Difference Of Arrival (DL-TDOA), Round-Trip Time (RTT), multi-cell RTT, WLAN (also referred to as WiFi) positioning, or Enhanced Cell ID (ECID) or combinations thereof. In some of these techniques (e.g. A-GNSS, AFLT, DL-TDOA), pseudoranges or timing differences may be measured at UE 104 relative to three or more terrestrial transmitters (e.g. gNBs 102) fixed at known locations or relative to four or more SVs 112 with accurately known orbital data, or combinations thereof, based at least in part, on pilots, positioning reference signals (PRS) or other positioning related signals transmitted by the transmitters or satellites and received at the UE 104.

The location server in FIG. 1B may correspond to, e.g., Location Management Function (LMF) 172, and may be capable of providing positioning assistance data to UE 104 including, for example, information regarding signals to be measured (e.g., expected signal timing, signal coding, signal frequencies, signal Doppler), locations and identities of terrestrial transmitters (e.g. gNBs 102) and/or signal, timing and orbital information for GNSS SVs 112 to facilitate positioning techniques such as A-GNSS, AFLT, AOD, DL-TDOA, multi-cell RTT, and ECID. The facilitation may include improving signal acquisition and measurement accuracy by UE 104 and, in some cases, enabling UE 104 to compute its estimated location based on the location measurements. For example, a location server (e.g. LMF 172) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 104 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 104 and a cellular transceiver (e.g. a gNB) or a local transceiver (e.g. a WiFi access point (AP)). A UE 104 may use these measurements together with assistance data (e.g. terrestrial almanac data or GNSS satellite data such as GNSS Almanac and/or GNSS Ephemeris information) received from a location server (e.g. LMF 172) or broadcast by a base station (e.g. a gNB 102) in NG-RAN 114 to determine a location for UE 104.

In some implementations, network entities are used to assist in location of a target UE 104. For example, entities in a network such as gNBs 102-1 and 102-2 may measure UL signals transmitted by UE 104. The UL signals may include or comprise UL reference signals such as UL positioning reference signals (PRSs) or UL Sounding Reference Signals (SRSs). The entities obtaining the location measurements (e.g. gNBs 102-1 and 102-2) may then transfer the location measurements to the UE 104 or LMF 172, which may use the measurements to determine or help determine the location of the UE 104. Examples of location measurements that may use UL signals can include an RSSI, RSRP, RSRQ, TOA, Rx-Tx, AOA and RTT.

An estimate of a location of the UE 104 may be referred to as a location, location estimate, location fix, fix, position, position estimate or position fix, and may be geodetic, thus providing location coordinates for the UE 104 (e.g., latitude and longitude) which may or may not include an altitude component (e.g., height above sea level, height above or depth below ground level, floor level or basement level). Alternatively, a location of the UE 104 may be expressed as a civic location (e.g., as a postal address or the designation of some point or small area in a building such as a particular room or floor). A location of the UE 104 may also be expressed as an area or volume (defined either geodetically or in civic form) within which the UE 104 is expected to be located with some probability or confidence level (e.g., 67%, 95%, etc.). A location of the UE 104 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event, or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1B, pairs of gNBs 102 in NG-RAN 114 may be connected to one another, e.g., directly as shown in FIG. 1B or indirectly via other gNBs 102-1, 102-2. Access to the 5G network is provided to UE 104 via wireless communication between the UE 104 and one or more of the gNBs 102-1 and 102-2, which may provide wireless communication access to the 5GCN 170 on behalf of the UE 104 using 5G (e.g. NR). In FIG. 1B, the serving gNB for UE 104 is assumed to be gNB 102-1, although other gNBs (e.g. gNB 102-2, 102-3, or ng-eNB 103) may act as a serving gNB if UE 104 moves to another location or may act as a secondary gNB to provide additional throughout and bandwidth to UE 104. Some gNBs in FIG. 1B (e.g. gNB 102-2, 102-3, or ng-eNB 103) may be configured to function as positioning-only beacons which may transmit signals (e.g. directional PRS) to assist positioning of UE 104 but may not receive signals from UE 104 or from other UEs.

As noted, while FIG. 1B depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 170. Thus, the NG-RAN 114 may include any combination of gNBs, evolved Node Bs (eNBs) supporting LTE, or other types of base stations or access points. As an example, NG-RAN 114 may include one or more ng-eNBs 103, which provide LTE wireless access to UE 104 and may connect to entities in 5GCN 170 such as AMF 174.

The gNBs 102-1, 102-2, 102-3, and ng-eNB 103 can communicate with the Access and Mobility Management Function (AMF) 174, which, for positioning functionality, may communicate with a Location Management Function (LMF) 172. The AMF 174 may support mobility of the UE 104, including cell change and handover and may participate in supporting a signaling connection to the UE 104. Other functions of AMF 174 may include: termination of a control plane (CP) interface from NG-RAN 114; termination of Non-Access Stratum (NAS) signaling connections from UEs such as UE 104, NAS ciphering and integrity protection; registration management; connection management; reachability management; mobility management; access authentication and authorization.

The gNB 102-1 may support positioning of the UE 104 when UE 104 accesses the NG-RAN 114. The gNB 102-1 may also process location service requests for the UE 104, e.g., received directly or indirectly from the GMLC 175. In some embodiments, a node/system that implements the gNB 102-1 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 104's location) may be performed at the UE 104 (e.g., using signal measurements for signals transmitted by wireless nodes, and assistance data provided to the UE 104).

The GMLC 175 may support a location request for the UE 104 received from an external client 130 and may forward such a location request to a serving AMF 174 for UE 104. The GMLC 175 may be connected to a Location Retrieval Function (LRF) 176 that retrieves location information for users that have initiated an emergency session. The AMF 174 may then forward the location request to either gNB 102-1 or LMF 172 which may obtain one or more location estimates for UE 104 (e.g. according to the request from external client 130) and may return the location estimate(s) to AMF 174, which may return the location estimate(s) to external client 130 via GMLC 175. GMLC 175 may contain subscription information for an external client 130 and may authenticate and authorize a location request for UE 104 from external client 130. GMLC 175 may further initiate a location session for UE 104 by sending a location request for UE 104 to AMF 174 and may include in the location request an identity for UE 104 and the type of location being requested (e.g. such as a current location or a sequence of periodic or triggered locations).

As shown in FIG. 1B, the 5GCN 170 may further comprise a Network Repository Function (NRF) 177, which may be connected with the AMF 174, LMF 172, and/or other network functions (not shown in FIG. 1B). The NRF 177 may be used to store information regarding various network functions within the 5GCN 170 (e.g. such as AMF 174 and/or LMF 172), which may be used for network function management (e.g., network function, discovery, authorization, and/or other functionality). For example, in some embodiments a first network function that may want to send information to a second network function may first query the NRF 177 to verify an address for the second network function. Additional information regarding the NRF 177 may be found, for example, in 3GPP TS 23.501.

As illustrated, a Unified Data Management (UDM) 171 may be connected to the GMLC 175, AMF 174, and a Network Exposure Function (NEF) 173. The UDM 171 is analogous to a Home Subscriber Server (HSS) for LTE access, and if desired, the UDM 171 may be combined with an HSS. The UDM 171 is a central database that contains user-related and subscription-related information for UE 104 and may perform the following functions: UE authentication, UE identification, access authorization, registration and mobility management, subscription management and Short Message Service management.

As further illustrated in FIG. 1B, an external client 130 may be connected to the core network 170 via the GMLC 175.

The Network Exposure Function (NEF) 173 may be connected to the GMLC 175, AMF 174, and UDM 171. In some implementations, the NEF 173 may be connected to communicate directly with the Application Function (AF) 132. The NEF 173 may support secure exposure of capabilities and events concerning 5GCN 170 and UE 104 to AF 132 and may enable secure provision of information from AF 132 to 5GCN 170. The NEF 173, for example, may also function to obtain a current or last known location for a UE 104, may obtain an indication of a change in location for a UE 104, or an indication of when a UE 104 becomes available (or reachable). An AF 132 may access NEF 173 in order to obtain location information for UE 104.

The LMF 172 and the gNB 102-1 may communicate using a New Radio Position Protocol A (NRPPa). NRPPa may be defined in 3GPP TS 38.455, with NRPPa messages being transferred between the gNB 102-1 and the LMF 172. Further, the LMF 172 and UE 104 may communicate using the LTE Positioning Protocol (LPP) defined in 3GPP TS 37.355, where LPP messages are transferred between the UE 104 and the LMF 172 via the serving AMF 174 and the serving gNB 102-1 for UE 104. For example, LPP messages may be transferred between the AMF 174 and the UE 104 using a 5G Non-Access Stratum (NAS) protocol. The LPP protocol may be used to support positioning of UE 104 using DL and UL+DL position methods such as Assisted GNSS (A-GNSS), Real Time Kinematic (RTK), Wireless Local Area Network (WLAN), DL Time Difference of Arrival (DL-TDOA), Round-Trip Time (RTT), multi-cell RTT, and/or Enhanced Cell Identity (ECID). The NRPPa protocol may be used to support positioning of UE 104 using UL and UL+DL position methods such as Uplink (UL) Time Difference of Arrival (UL-TDOA), Uplink (UL) angle of arrival (UL-AOA), multi-cell RTT, or ECID (when used with measurements obtained by or received from a gNB 102-1, 102-2, 102-3, or ng-eNB 103) and/or may be used by LMF 172 to obtain location related information from gNBs 102 such as parameters defining positioning reference signal (PRS) transmission from gNBs 102 for support of DL-TDOA.

gNBs 102-1, 102-2, 102-3, or ng-eNB 103 may communicate with AMF 174 using a Next Generation Application Protocol (NGAP), e.g. as defined in 3GPP Technical Specification (TS) 38.413). NGAP may enable AMF 174 to request a location of a target UE 104 from a gNB 102-1 for target UE 104 and may enable gNB 102-1 to return a location for UE 104 to the AMF 174.

gNBs 102-1, 102-2, 102-3, or ng-eNB 103 may communicate with one another using an Xn Application Protocol (XnAP), e.g. as defined in 3GPP TS 38.423. XnAP may allow one gNB 102 to request another gNB 102 to obtain UL location measurements for a target UE 104 and to return the UL location measurements. XnAP may also enable a gNB 102 to request another gNB 102 to transmit a downlink (DL) RS or PRS to enable a target UE 104 to obtain DL location measurements of the transmitted DL RS or PRS.

A gNB (e.g. gNB 102-1) may communicate with a target UE 104 using a Radio Resource Control (RRC) protocol, e.g. as defined in 3GPP TS 38.331. RRC may allow a gNB (e.g. gNB 102-1) to request location measurements from the target UE 104 of DL RSs or DL PRSs transmitted by the gNB 102-1 and/or by other gNBs 102-2, 102-3, or ng-eNB 103 and to return some or all of the location measurements. RRC may also enable a gNB (e.g. gNB 102-1) to request the target UE 104 to transmit an UL RS or PRS to enable the gNB 102-1 or other gNBs 102-2, 102-3, or ng-eNB 103 to obtain UL location measurements of the transmitted UL RS or PRS.

With a UE assisted position method, UE 104 may obtain location measurements (e.g. measurements of RSSI, Rx-Tx, RTT, AOA, RSTD, RSRP and/or RSRQ for gNBs 102-1, 102-2, 102-3, or ng-eNB 103 or WLAN APs, or measurements of GNSS pseudorange, code phase and/or carrier phase for SVs 112) and send the measurements to an entity performing a location server function, e.g., LMF 172, for computation of a location estimate for UE 104. With a UE based position method, UE 104 may obtain location measurements (e.g. which may be the same as or similar to location measurements for a UE assisted position method) and may compute a location of UE 104 (e.g. with the help of assistance data received from a location server such as LMF 172). With a network based position method, one or more base stations (e.g. gNBs 102-1, 102-2) or APs may obtain location measurements (e.g. measurements of RSSI, RTT, AOA, RSRP, RSRQ, Rx-Tx or TOA for signals transmitted by UE 104) and/or may receive measurements obtained by UE 104, and may send the measurements to a location server, e.g., LMF 172, for computation of a location estimate for UE 104.

Information provided by the gNBs 102-2, 102-3, or ng-eNB 103 to the gNB 102-1 using XnAP may include timing and configuration information for PRS transmission and location coordinates of the gNBs 102-2, 102-3, or ng-eNB 103. The gNB 102-1 can then provide some or all of this information to the UE 104 as assistance data in an RRC message. An RRC message sent from gNB 102-1 to UE 104 may include an embedded LPP message in some implementations.

An RRC message sent from the gNB 102-1 to the UE 104 may instruct the UE 104 to do any of a variety of things, depending on desired functionality. For example, the RRC message could contain an instruction for the UE 104 to obtain measurements for GNSS (or A-GNSS), WLAN, and/or DL-TDOA (or some other position method) or to transmit uplink (UL) signals, such as Positioning Reference Signals, Sounding Reference Signals, or both. In the case of DL-TDOA, the RRC message may instruct the UE 104 to obtain one or more measurements (e.g. RSTD measurements) of PRS signals transmitted within particular cells supported by particular gNBs 102. The UE 104 may use the measurements to determine the position of UE 104, e.g., using DL-TDOA.

A gNB 102 in NG-RAN 114 may also broadcast positioning assistance data to UEs such as UE 104.

In some embodiments, a first UE 104 or first PRU 105 may be able to transmit sidelink (SL) PRS signals which may be measured by a second UE 104 or a second PRU 105 and may enable or help enable determination of a relative location, range and/or direction for the first or second UE 104 or PRU 105. For example, an LMF 172 may request a PRU 105 to measure SL PRS transmitted by a target UE 104 and return the measurement(s) to the LMF 172, or may request the target UE 104 to measure SL PRS transmitted by the PRU 105 and similarly return the measurement(s) to the LMF 172. The LMF 172 may then use such measurements and a known location of the PRU 105 to determine or help determine a location of the target UE 104.

It should be understood that while FIG. 1B shows a network architecture for a non-roaming UE 104, with suitable, well-known, changes, a corresponding network architecture may be provided for a roaming UE 104.

Figure 2A:
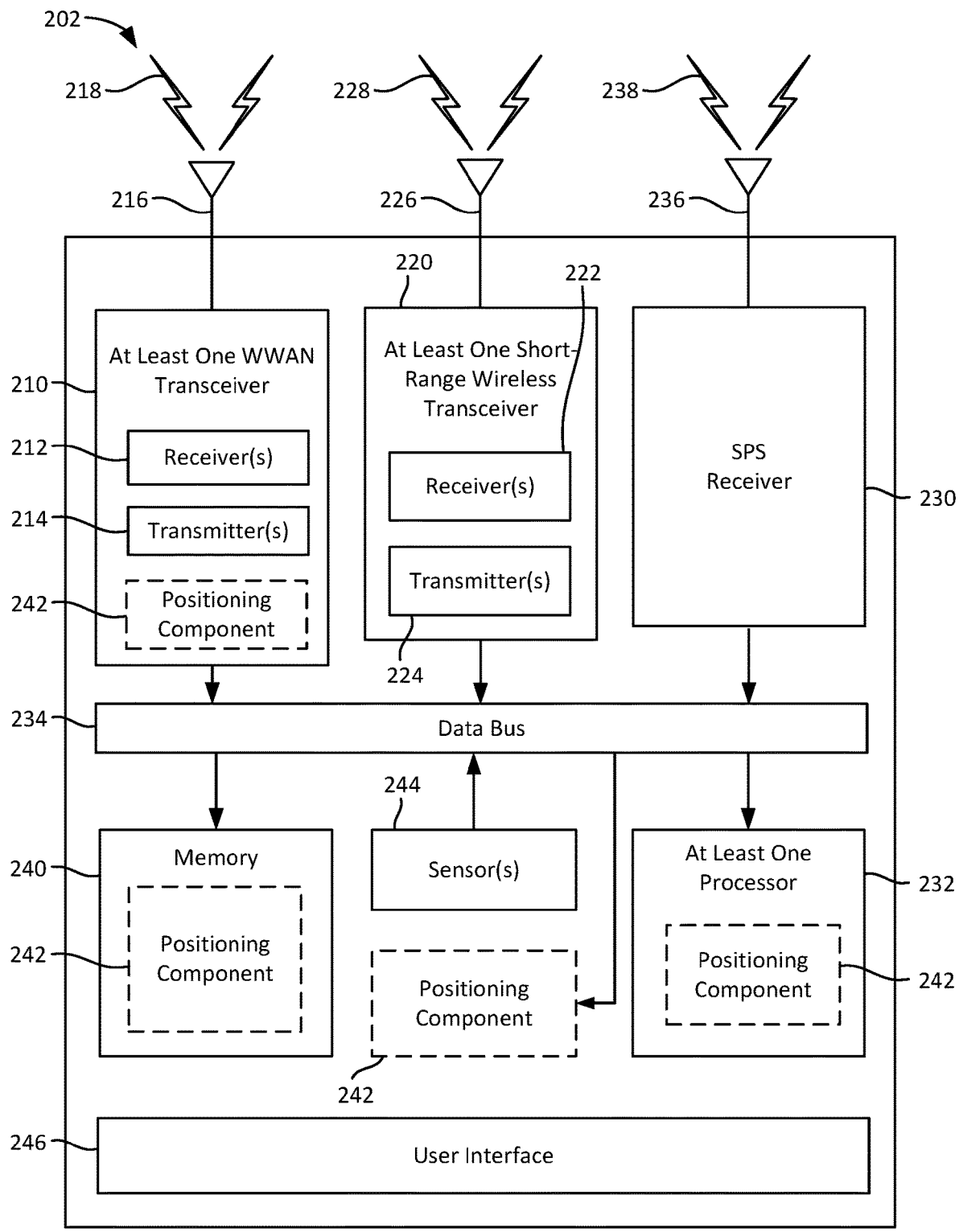
Figure 2B:
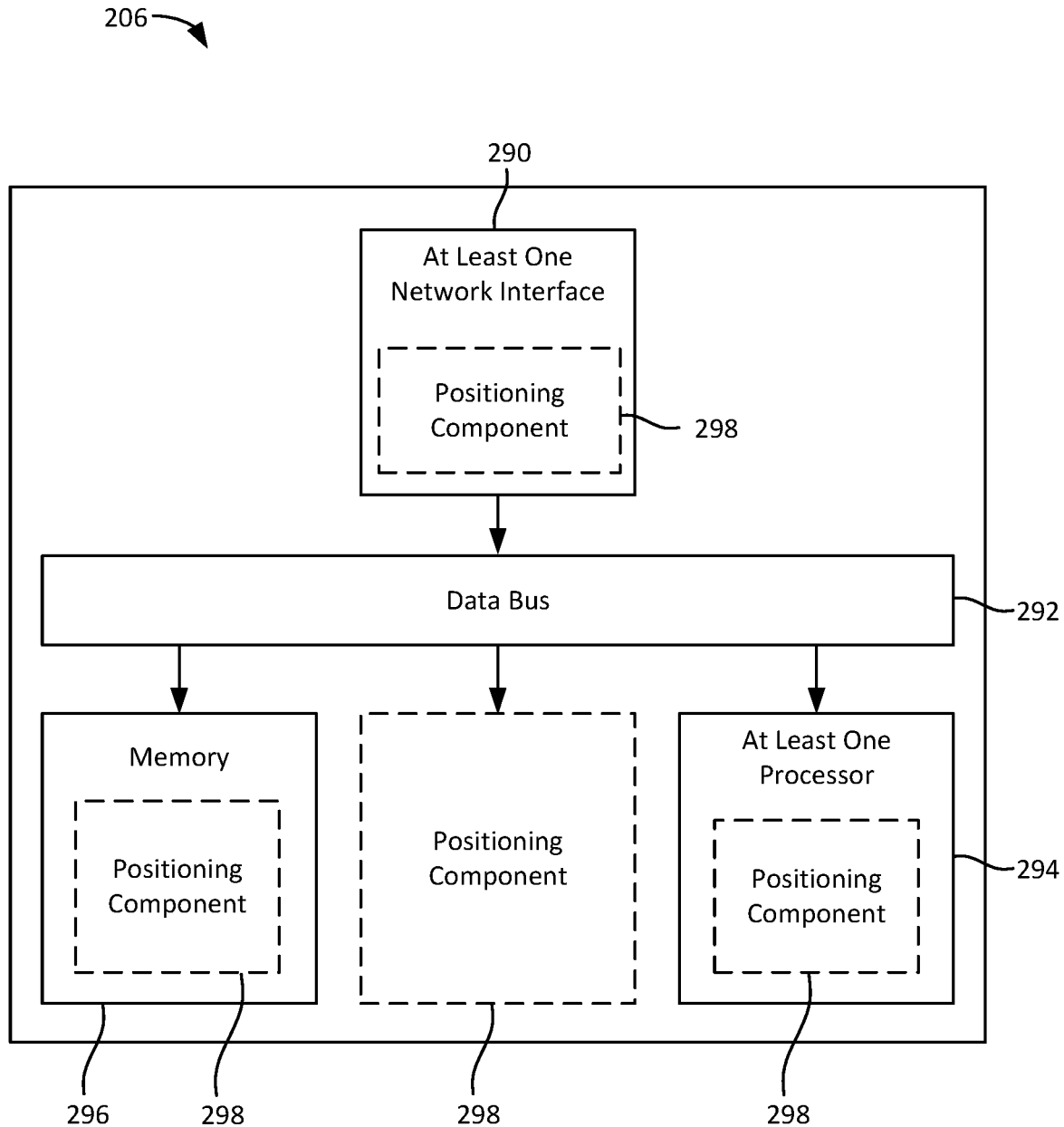

FIGS. 2A and 2B illustrate several example components (represented by corresponding blocks) that may be incorporated into a UE 202 (which may correspond to any of the UEs described herein and which may also be an RLD or a PRU as discussed herein), a base station 204 (which may correspond to any of the base stations described herein), and a network entity 206 (which may correspond to or embody any of the network functions described herein, including the location server/LMF 172, or alternatively may be independent from the NG-RAN 114 and/or 5GCN 170 infrastructure, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 202 includes at least one wireless wide area network (WWAN) transceiver 210 providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceiver 210 may be connected to one or more antennas 216 for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 210 may be variously configured for transmitting and encoding signals 218 (e.g., messages, indications, information, and so on), respectively, and conversely, for receiving and decoding signals 218 (e.g., messages, indications, information, pilots, and so on), respectively, in accordance with the designated RAT. Specifically, the WWAN transceiver 210 includes one or more transmitters 214 for transmitting and encoding signals 218 and one or more receivers 212 for receiving and decoding signals 218.

The UE 202 also includes, at least in some cases, at least one short-range wireless transceiver 220. The short-range wireless transceiver 220 may be connected to one or more antennas 226 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceiver 220 may be variously configured for transmitting and encoding signals 228 (e.g., messages, indications, information, and so on), respectively, and conversely, for receiving and decoding signals 228 (e.g., messages, indications, information, pilots, and so on), respectively, in accordance with the designated RAT. Specifically, the short-range wireless transceiver 220 includes one or more transmitters 224, respectively, for transmitting and encoding signals 228, respectively, and one or more receivers 222, respectively, for receiving and decoding signals 228. As specific examples, the short-range wireless transceiver 220 may comprise a WiFi transceiver, Bluetooth® transceiver, Zigbee® and/or Z-Wave® transceiver, NFC transceiver, or vehicle-to-vehicle (V2V) and/or vehicle-to-everything (V2X) transceiver.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 216, 226), such as an antenna array, that permits the respective apparatus to perform transmit "beamforming," as described herein. Similarly, a receiver may include or be coupled to a plurality of antennas (e.g., antennas 216, 226), such as an antenna array, that permits the respective apparatus to perform receive beamforming, as described herein. In an aspect, the transmitter and receiver may share the same plurality of antennas (e.g., antennas 216, 226), such that the respective apparatus can only receive or transmit at a given time, not both at the same time. A wireless communication device (e.g., one or both of the transceivers 210 and 220) of the UE 202 may also comprise a network listen module (NLM) or the like for performing various measurements.

The UE 202 and also includes, at least in some cases, a satellite positioning systems (SPS) receivers 230. The SPS receiver 230 may be connected to one or more antennas 236 and may provide means for receiving and/or measuring SPS signals 238 such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receiver 230 may comprise any suitable hardware and/or software for receiving and processing SPS signals 238. The SPS receiver 230 requests information and operations as appropriate from the other systems, and performs calculations necessary to determine positions of the UE 202 using measurements obtained by any suitable SPS algorithm.

The network entity 206 may include at least one network interface and 290, respectively, providing means for communicating (e.g., means for transmitting, means for receiving, etc.) with other network entities. For example, the network interface 290 (e.g., one or more network access ports) may be configured to communicate with one or more network entities via a wire-based or wireless backhaul connection. In some aspects, the network interface 290 may be implemented as transceivers configured to support wire-based or wireless signal communication. This communication may involve, for example, sending and receiving messages, parameters, and/or other types of information.

In an aspect, the at least one WWAN transceiver 210 and/or the at least one short-range wireless transceiver 220 may form a (wireless) communication interface of the UE 202. Likewise, the at least one network interface 290 may form a (wireless) communication interface of the network entity 206. The various wireless transceivers (e.g., transceivers 210, 220) and wired transceivers (e.g., network interface 290) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 202 and the network entity 206 also include other components that may be used in conjunction with the operations as disclosed herein. The UE 202 and the network entity 206 include at least one processor 232 and 294, respectively, for providing functionality relating to, for example, wireless communication, and for providing other processing functionality. The processors 232 and 294 may therefore provide means for processing, such as means for determining, means for calculating, means for receiving, means for transmitting, means for indicating, etc. In an aspect, the processors 232 and 294 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 202 and the network entity 206 include memory circuitry implementing memory components 240 and 296 (e.g., each including a memory device), respectively, for maintaining information (e.g., information indicative of reserved resources, thresholds, parameters, and so on). The memory components 240 and 296 may therefore provide means for storing, means for retrieving, means for maintaining, etc. In some cases, the UE 202 and the network entity 206 may include positioning components 242 and 298, respectively. The positioning components 242 and 298 may be hardware circuits that are part of or coupled to the processors 232 and 294, respectively, that, when executed, cause the UE 202 and the network entity 206 to perform the functionality described herein. In other aspects, the positioning components 242 and 298 may be external to the processors 232 and 294 (e.g., part of a modem processing system, integrated with another processing system, etc.). Alternatively, the positioning components 242 and 298 may be memory modules stored in the memory components 240 and 296, respectively, that, when executed by the processors 232 and 294 (or a modem processing system, another processing system, etc.), cause the UE 202 and the network entity 206 to perform the functionality described herein. FIG. 2A illustrates possible locations of the positioning component 242, which may be, for example, part of the at least one WWAN transceiver 210, the memory component 240, the at least one processor 232, or any combination thereof, or may be a standalone component FIG. 2 illustrates possible locations of the positioning component 298, which may be, for example, part of the at least one network interface 290, the memory component 296, the at least one processor 294, or any combination thereof, or may be a standalone component.

The UE 202 may include one or more sensors 244 coupled to the at least one processor 232 to provide means for sensing or detecting movement and/or orientation information that is independent of motion data derived from signals received by the at least one WWAN transceiver 210, the at least one short-range wireless transceiver 220, and/or the SPS receiver 230. By way of example, the sensor(s) 244 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 244 may include a plurality of different types of devices and combine their outputs in order to provide motion information. For example, the sensor(s) 244 may use a combination of a multi-axis accelerometer and orientation sensors to provide the ability to compute positions in two-dimensional (2D) and/or three-dimensional (3D) coordinate systems.

In addition, the UE 202 includes a user interface 246 providing means for providing indications (e.g., audible and/or visual indications) to a user and/or for receiving user input (e.g., upon user actuation of a sensing device such a keypad, a touch screen, a microphone, and so on). Although not shown, the base station 204 and the network entity 206 may also include user interfaces.

At the UE 202, the receiver 212 receives a signal through its respective antenna(s) 216. The receiver 212 recovers information modulated onto an RF carrier and provides the information to the at least one processor 232. The transmitter 214 and the receiver 212 implement Layer-1 functionality associated with various signal processing functions. The receiver 212 may perform spatial processing on the information to recover any spatial streams destined for the UE 202. If multiple spatial streams are destined for the UE 202, they may be combined by the receiver 212 into a single OFDM symbol stream. The receiver 212 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 204. These soft decisions may be based on channel estimates computed by a channel estimator. The soft decisions are then decoded and de-interleaved to recover the data and control signals that were originally transmitted by the base station 204 on the physical channel. The data and control signals are then provided to the at least one processor 232, which implements Layer-3 (L3) and Layer-2 (L2) functionality.

In the uplink, the at least one processor 232 provides demultiplexing between transport and logical channels, packet reassembly, deciphering, header decompression, and control signal processing to recover IP packets from the core network. The at least one processor 232 is also responsible for error detection.

Similar to the functionality described in connection with the downlink transmission by the base station 204, the at least one processor 232 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 204 may be used by the transmitter 214 to select the appropriate coding and modulation schemes, and to facilitate spatial processing. The spatial streams generated by the transmitter 214 may be provided to different antenna(s) 216. The transmitter 214 may modulate an RF carrier with a respective spatial stream for transmission.

For convenience, the UE 202 and/or the network entity 206 are shown in FIGS. 2A and 2B as including various components that may be configured according to the various examples described herein. It will be appreciated, however, that the illustrated components may have different functionality in different designs.

The various components of the UE 202 and the network entity 206 may communicate with each other over data buses 234 and 292, respectively. In an aspect, the data buses 234 and 292 may form, or be part of, the communication interface of the UE 202 and the network entity 206, respectively. For example, where different logical entities are embodied in the same device, the data buses 234 and 292 may provide communication between them.

The components of FIGS. 2A and 2B may be implemented in various ways. In some implementations, the components of FIGS. 2A and 2B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 246 may be implemented by processor and memory component(s) of the UE 202 (e.g., by execution of appropriate code and/or by appropriate configuration of processor components). Also, some or all of the functionality represented by blocks 290 to 298 may be implemented by processor and memory component(s) of the network entity 206 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 202, network entity 206, etc., such as the processors 232 294, the transceivers 210, 220, the memory components 240 and 296, the positioning components 242 and 298, etc.

In some designs, the network entity 206 may be implemented as a core network component. In other designs, the network entity 206 may be distinct from a network operator or operation of the cellular network infrastructure (e.g., NG RAN 114 and/or 5GCN 170). For example, the network entity 206 may be a component of a private network that may be configured to communicate with the UE 202 via the base station 204 or independently from the base station (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server/LMF 172 or SLP) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

Figure 3:
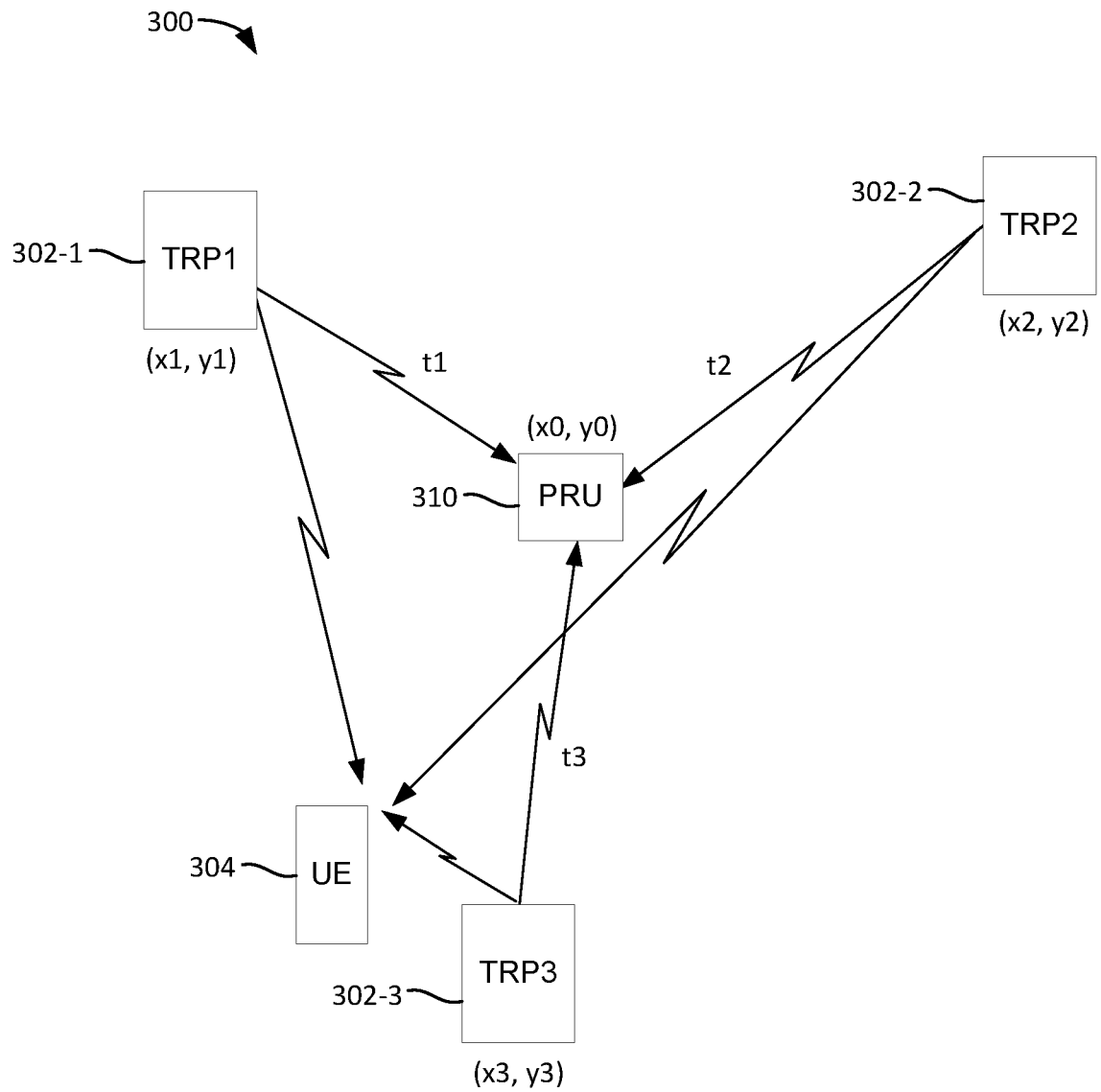
FIG. 3 is a diagram of an example wireless communications network in which a positioning reference unit (PRU) is used to assist the positioning of a UE, according to aspects of the disclosure.

FIG. 3 is a diagram 300 of an example wireless communications network in which a PRU 310 (also referred to as a reference device) is used to assist the positioning of a UE 304, according to aspects of the disclosure. In the example of FIG. 3, a UE 304 (e.g., any of the UEs described herein, including UE 202 of FIG. 2A) is engaged in a positioning session with three TRPs 302-1, 302-2, and 302-3 (collectively, TRPs 302), labeled "TRP1," "TRP2," and "TRP3," respectively. The TRPs 302 are transmitting downlink reference signals (e.g., DL-PRS) towards the UE 304 to enable the UE 304 to perform positioning measurements (e.g., RSTD measurements in the example of FIG. 3) of the reference signals.

The PRU 310 also receives and measures the downlink reference signals from TRPs 302 and reports the measurements (e.g., RSTDs) to a location server (not shown). Where the TRP 302-1 is the reference TRP, the RSTD for TRP 302-2 as measured by the PRU 310 can be represented as $RSTD_{meas} = t2 - t1$. The location server knows the locations of the PRU 310 and the TRPs 302 and can therefore calculate the "true" (expected) RSTD at the PRU's 310 location as:

$$RSTD_{true}=(\sqrt{(x_2-x_0)^2+(y_2-y_0)^2}-\sqrt{(x_1-x_0)^2+(y_1-y_0)^2})/c \quad (Eq\ 1)$$

where c is the speed of light. $(x_0, y_0)$ (represented as $(x_0, y_0)$ in FIG. 3) is the known location of the PRU 310, $(x_1, y_1)$ (represented as $(x_1, y_1)$ in FIG. 3) is the known location of TRP 302-1, and $(x_2, y_2)$ (represented as $(x_2, y_2)$ in FIG. 3) is the known location of TRP 302-2. The RSTD equation above in Eq 1 may assume that TRPs 302 should be synchronized and therefore transmit downlink reference signals at the same time or same times. However, there may be errors in the synchronization which the location server can determine as described next.

The location server obtains the measured RSRD, $RSTD_{meas}$, from the PRU 310 and determines an error term € as:

$$e=RSTD_{true}-RSTD_{meas}$$

When a normal UE 304 (at an unknown location) is measuring the RSTD between TRP 302-1 and TRP 302-2, the location server can use the previously determined error term to correct the UE's 304 measured RSTD as:

$$RSTD_{corrected,UE}=RSTD_{meas,UE}+e$$

The location server can then use the corrected RSTD to estimate the UE's 304 location. The same principle applies to uplink positioning methods, where the PRU transmits an uplink positioning signal (e.g., SRS) that is measured by the TRPs. The TRP uplink measurements can be compared with the "true" (expected) uplink measurement (e.g., an UL-AoA, an UL-RTOA, etc.) given the known locations of the PRU and TRPs. The difference between the "true" (expected) uplink measurement and the actual performed measurement would define an error term that can be used to correct a UE's uplink measurements.

To assist NR positioning techniques, a PRU with known location may support the following functionalities:
Measure DL-PRS and report the associated measurements (e.g., RSTD, Rx-Tx time difference, RSRP, etc.) to the location server; and
Transmit SRS and enable TRPs to measure and report measurements (e.g., RTOA, Rx-Tx time difference, AoA) associated with the reference device to the location server.
A PRU may also support the following functionalities:
Report the details of the signaling, the measurements, the parameters related to the reception and transmission timing delays, AoD and AoA enhancements, and measurement calibrations;
The report of device location coordinate information to the LMF if the LMF does not have the information;
The PRU with the known location being a UE and/or a gNB; and
The precision to which the location of the reference device is known.

A PRU performs positioning measurements just like a normal UE, but at an a-priori known location. Therefore, the PRU- and TRP-terminated positioning protocols can be the same protocols as used for normal UE positioning.

Figure 4:
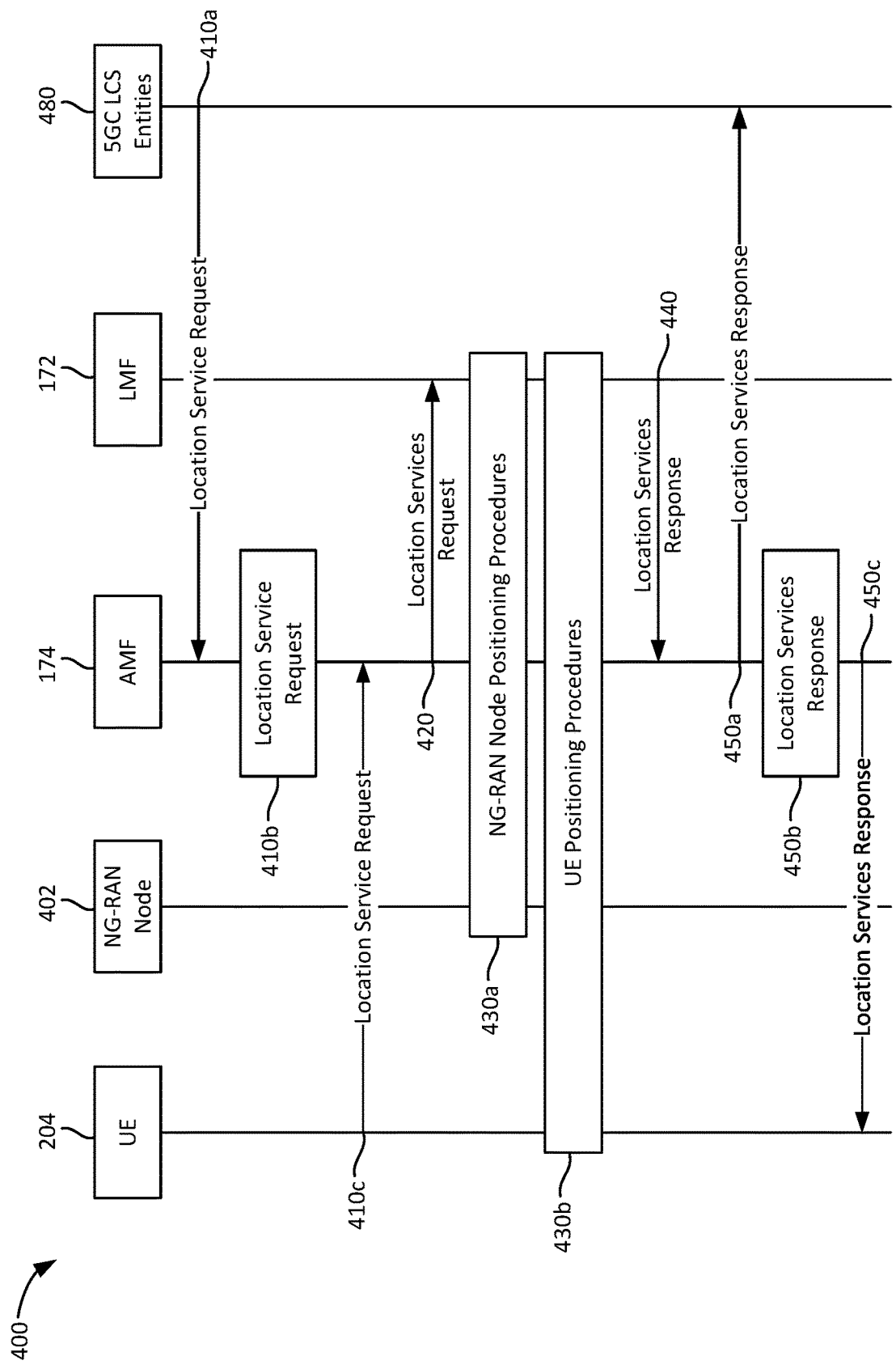
FIG. 4 illustrates an example positioning operation, according to aspects of the disclosure.

FIG. 4 illustrates an example target UE positioning operation 400, according to aspects of the disclosure. The UE positioning operation 400 may be performed by a UE 304, an NG-RAN node 402 (e.g., gNB 102, ng-eNB 103, or other node in the NG-RAN 114) in the NG-RAN 114, an AMF 174, an LMF 172, and a 5GCN location services (LCS) entity 480 (e.g., any third-party application requesting the UE's 204 location, public service access point (PSAP), E-911 server, etc.). In FIG. 4, and in other figures discussed herein, operations may be referred to as numerical "stages." Further, in some figures, operations may be labeled with their corresponding stage numbers.

A location services request to obtain the location of a target (i.e., UE 304) may be initiated by a 5GCN LCS entity 480, the AMF 174 serving the UE 304, or the UE 304 itself. FIG. 4 illustrates these options as stages 410a, 410b, and 410c, respectively. Specifically, at stage 410a, a 5GCN LCS entity 480 sends a location services request to the AMF 174. Alternatively, at stage 410b, the AMF 174 generates a location services request itself. Alternatively, at stage 410c, the UE 304 sends a location services request to the AMF 174.

Once the AMF 174 has received (or generated) a location services request, it forwards the location services request to the LMF 172 at stage 420. The LMF 172 then performs NG-RAN positioning procedures with the NG-RAN node 402 at stage 430a and UE positioning procedures with the UE 304 at stage 430b. The specific NG-RAN positioning procedures and UE positioning procedures may depend on the type(s) of positioning method(s) used to locate the UE 304, which may depend on the capabilities of the UE 304. The positioning method(s) may be downlink-based (e.g., LTE-OTDOA, DL-TDOA, and DL-AoD), uplink-based (e.g., UL-TDOA and UL-AoA), and/or downlink-and-uplink-based (e.g., LTE/NR E-CID and RTT), as described above. Corresponding positioning procedures are described in detail in 3GPP Technical Specification (TS) 38.305, which is publicly available and incorporated by reference herein in its entirety.

The NG-RAN positioning procedures and UE positioning procedures may utilize LTE positioning protocol (LPP) signaling between the UE 304 and the LMF 172 and LPP type A (LPPa) or NR positioning protocol type A (NRPPa) signaling between the NG-RAN node 402 and the LMF 172. LPP is used point-to-point between a location server (e.g., LMF 172) and a UE (e.g., UE 304) in order to obtain location-related measurements or a location estimate or to transfer assistance data. A single LPP session is used to support a single location request (e.g., for a single MT-LR, MO-LR, or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures.

A prerequisite for stage 430 is that an LCS Correlation identifier (ID) and the AMF ID has been passed to the LMF 172 by the serving AMF 174. Both, the LCS Correlation ID and the AMF ID may be represented as a string of characters selected by the AMF 174. The LCS Correlation ID and the AMF ID are provided by the AMF 174 to the LMF 172 in the location services request at stage 420. When the LMF 172 then instigates stage 430, the LMF 172 also includes the LCS Correlation ID for this location session, together with the AMF ID, which indicates the AMF instance serving the UE 304. The LCS Correlation identifier is used to ensure that during a positioning session between the LMF 172 and the UE 304, positioning response messages from the UE 304 are returned by the AMF 174 to the correct LMF 172 and carrying an indication (the LCS Correlation identifier) that can be recognized by the LMF 172.

Note that the LCS Correlation ID serves as a location session identifier that may be used to identify messages exchanged between the AMF 174 and the LMF 172 for a particular location session for a UE, as described in greater detail in 3GPP TS 23.273, which is publicly available and incorporated by reference herein in its entirety. As mentioned above and shown in stage 420, a location session between an AMF 174 and an LMF 172 for a particular UE is instigated by the AMF 174, and the LCS Correlation ID may be used to identify this location session (e.g., may be used by the AMF 174 to identify state information for this location session, etc.).

LPP positioning methods and associated signaling content are defined in the 3GPP LPP standard (3GPP TS 37.355, which is publicly available and incorporated by reference herein in its entirety). LPP signaling can be used to request and report measurements related to the following positioning methods: LTE-OTDOA, DL-TDOA, A-GNSS, E-CID, sensor, TBS, WLAN, Bluetooth, DL-AoD, UL-AoA, and multi-RTT. Currently, LPP measurement reports may contain the following measurements: (1) one or more ToA, TDOA, RSTD, or Rx-Tx measurements, (2) one or more AoA and/or AoD measurements (currently only for a base station to report UL-AoA and DL-AoD to the LMF 172), (3) one or more multipath measurements (per-path ToA, RSRP, AoA/AoD), (4) one or more motion states (e.g., walking, driving, etc.) and trajectories (currently only for the UE 304), and (5) one or more report quality indications.

As part of the NG-RAN node positioning procedures (stage 430*a*) and UE positioning procedures (stage 430*b*), the LMF 172 may provide LPP assistance data in the form of DL-PRS configuration information to the NG-RAN node 402 and the UE 304 for the selected positioning method(s). Alternatively or additionally, the NG-RAN node 402 may provide DL-PRS and/or UL-PRS configuration information to the UE 304 for the selected positioning method(s). Note that while FIG. 4 illustrates a single NG-RAN node 402, there may be multiple NG-RAN nodes 402 involved in the positioning session.

Once configured with the DL-PRS and UL-PRS configurations, the NG-RAN node 402 and the UE 304 transmit and receive/measure the respective PRS at the scheduled times. The NG-RAN node 402 and the UE 304 then send their respective measurements to the LMF 172.

Once the LMF 172 obtains the measurements from the UE 304 and/or the NG-RAN node 402 (depending on the type(s) of positioning method(s)), it calculates an estimate of the UE's 204 location using those measurements. Then, at stage 440, the LMF 172 sends a location services response, which includes the location estimate for the UE 304, to the AMF 174. The AMF 174 then forwards the location services response to the entity that generated the location services request at stage 410. Specifically, if the location services request was received from a 5GCN LCS entity 480 at stage 410*a*, then at stage 450*a*, the AMF 174 sends a location services response to the 5GCN LCS entity 480. If, however, the location services request was received from the UE 304 at stage 410*c*, then at stage 450*c*, the AMF 174 sends a location services response to the UE 304. Or, if the AMF 174 generated the location services request at stage 410*b*, then at stage 450*b*, the AMF 174 stores/uses the location services response itself.

Note that although the foregoing has described the UE positioning operation 400 as a UE-assisted positioning operation, it may instead be a UE-based positioning operation. A UE-assisted positioning operation is one where the LMF 172 estimates the location of the UE 304, whereas a UE-based positioning operation is one where the UE 204 estimates its own location.

Referring to PRUs in the context of FIG. 4, any PRU location measurements could be used by an LMF 172 to correct the measurements for target UEs 204. That is, the consumer of the PRU location information is an LMF 172, and therefore, stages 410 and 420 need not occur for PRUs. This essentially means that the LMF 172 becomes an "LCS Client" for PRUs and needs to be enabled to instigate location sessions with a PRU in absence of stages 410 and 420. Thus, for PRUs, an AMF 174/LMF 172 would not normally receive a location request from an LCS client; instead, the location client for PRU measurements would be the LMF 172 itself.

As a consequence of the above, for a PRU positioning operation, stages 410 and 420 in FIG. 4 can be replaced by an "PRU Registration" procedure to make an LMF aware of PRUs in a network, such that the LMF is enabled to instigate an LPP or NRPPa session with the desired PRU or NG-RAN serving the PRU, respectively.

Figure 5:
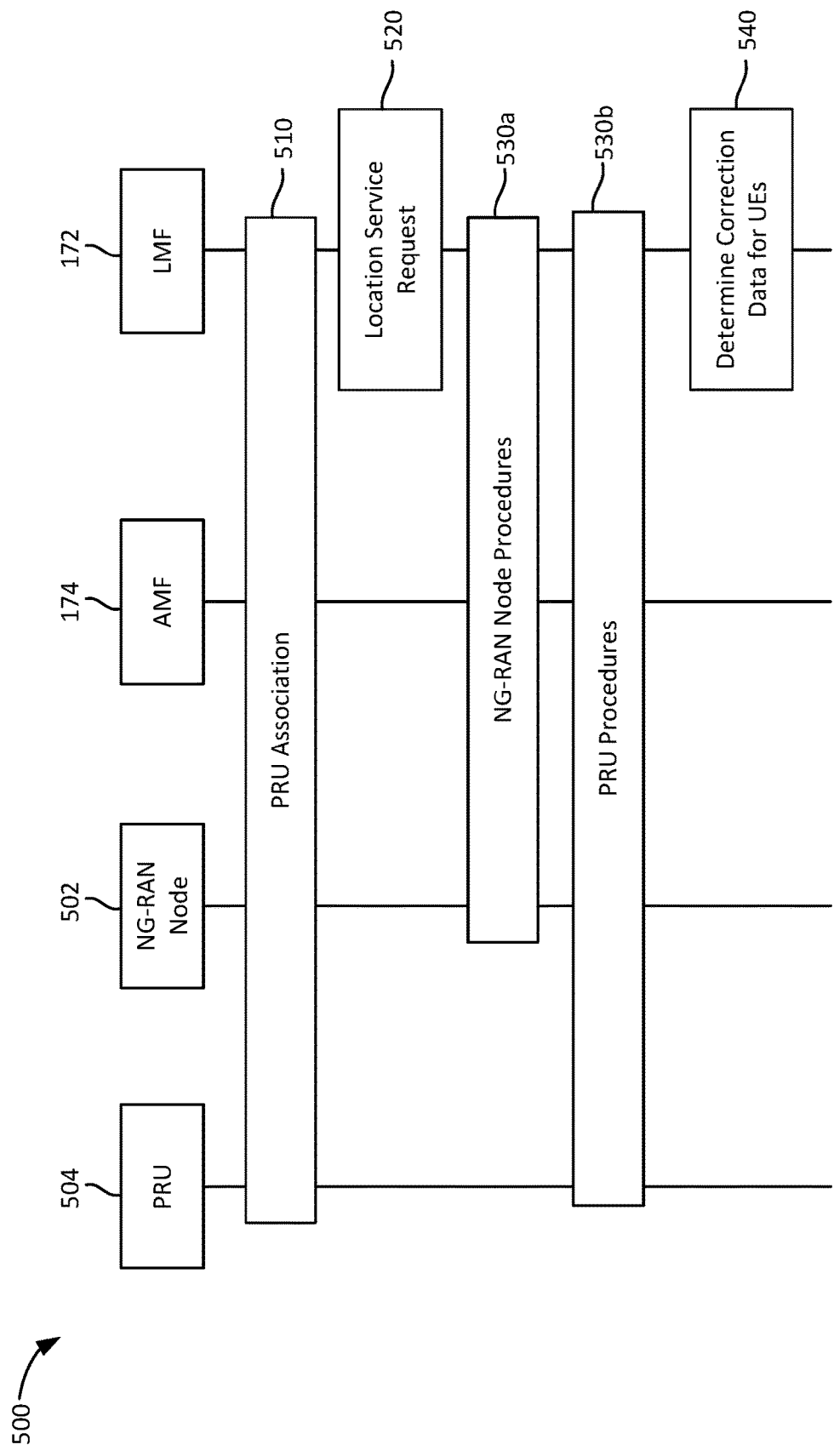
FIG. 5 illustrates an example PRU positioning operation, according to aspects of the disclosure.

FIG. 5 illustrates an example PRU positioning operation 500, according to aspects of the disclosure. The PRU positioning operation 500 may be performed by a PRU 504 (e.g., any of the PRUs described herein), an NG-RAN node 502 (e.g., gNB 102, ng-eNB 103), an AMF 174, and an LMF 172.

At stage 510, a PRU association procedure is performed to make the LMF 172 aware of the PRUs 504 in the network. The association procedure depends on whether the PRU 504 is considered to be a UE or a gNB, and different association procedures are described below. At stage 520, the LMF 172 initiates a location services request internally to obtain the location of a target PRU 504 in order to determine correction data for UE positioning. The LMF 172 then performs NG-RAN procedures with the NG-RAN node 502 at stage 530*a* and PRU procedures with the PRU 504 at stage 530*b*. The PRU association procedure at stage 510 enables the LMF 172 to instigate the positioning procedures at stage 530 in a similar way as currently specified for target UEs. At stage 540, the LMF 172 determines correction data for UE positioning, as described above with reference to FIG. 3.

Figure 6:
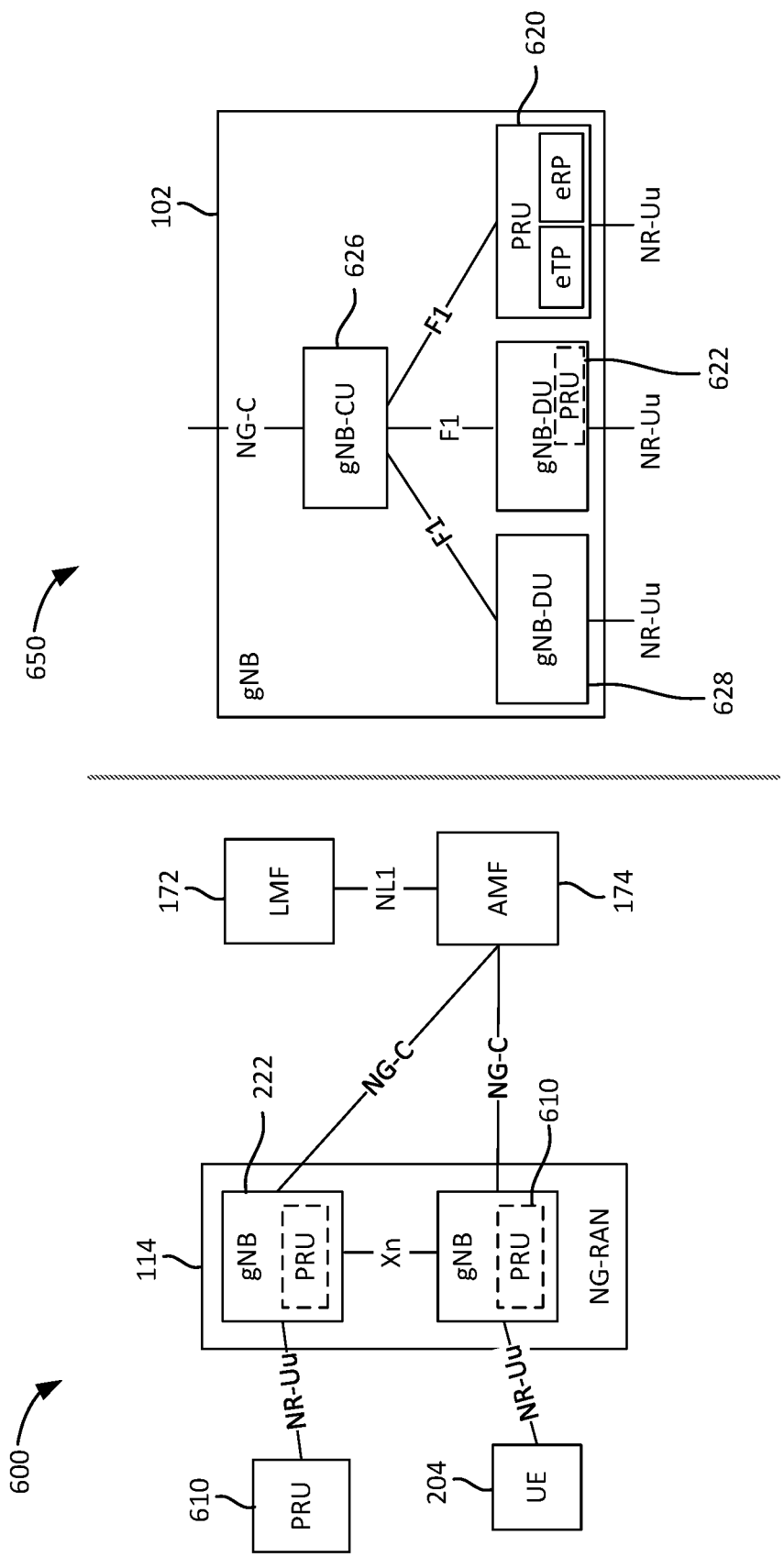
FIG. 6 illustrates the two principal architecture options for supporting PRUs in a network, according to aspects of the disclosure.

FIG. 6 illustrates two possible architecture options for supporting PRUs in a network, according to aspects of the disclosure. As a first option, as shown by diagram 600, a PRU 610 (e.g., PRU 105 shown in FIG. 1B or any of the other PRUs described herein) is considered as a UE (e.g., as a UE 304) from the LMF's 172 perspective. Such a PRU may be any device that supports a control plane protocol stack and LPP positioning methods. This may include normal (mobile) UEs, dedicated UEs (which may typically be at fixed locations but may also be mobile), the mobile terminal (MT) of an integrated access and backhaul (IAB) node, the MT of a smart repeater, or the like. As an example, such a PRU may be a UE, as illustrated and described elsewhere herein.

As a second option, as shown by diagram 650, a PRU (such as PRU 105 shown in FIG. 1B or any of the other PRUs described herein) is considered as part of a gNB 102 from the LMF's 172 perspective, either as a gNB-DU 628 (PRU 622) or an enhanced TRP (eTRP) (PRU 620). An eTRP is composed of an enhanced transmission point (eTP) and an enhanced reception point (eRP)). As an example, such a PRU may be, or may be part of, a base station, such as a gNB 102 or ng-eNB 103 as illustrated in FIG. 1B. As discussed in greater detail below, in this option, LPP messages are encapsulated in NRPPa. The gNB-CU 626 (which terminates NRPPa) extracts the LPP PDU and forwards it to the PRU 620 using the F1 interface. A PRU as shown in diagram 650 may have some functions of a UE 104 but may not always be seen as, or treated as, a UE by an LMF 172 or AMF 174.

The PRU 105 may be enabled to support positioning functions of a UE 104 and may be further enabled to support some positioning functions of a gNB 102. Support may be provided through use of an existing Supplementary Service protocol (e.g., such as the protocol defined in 3GPP TS 24.080) to enable interaction between the PRU 105 and the LMF 172 that is transparent to other entities.

Figure 7:
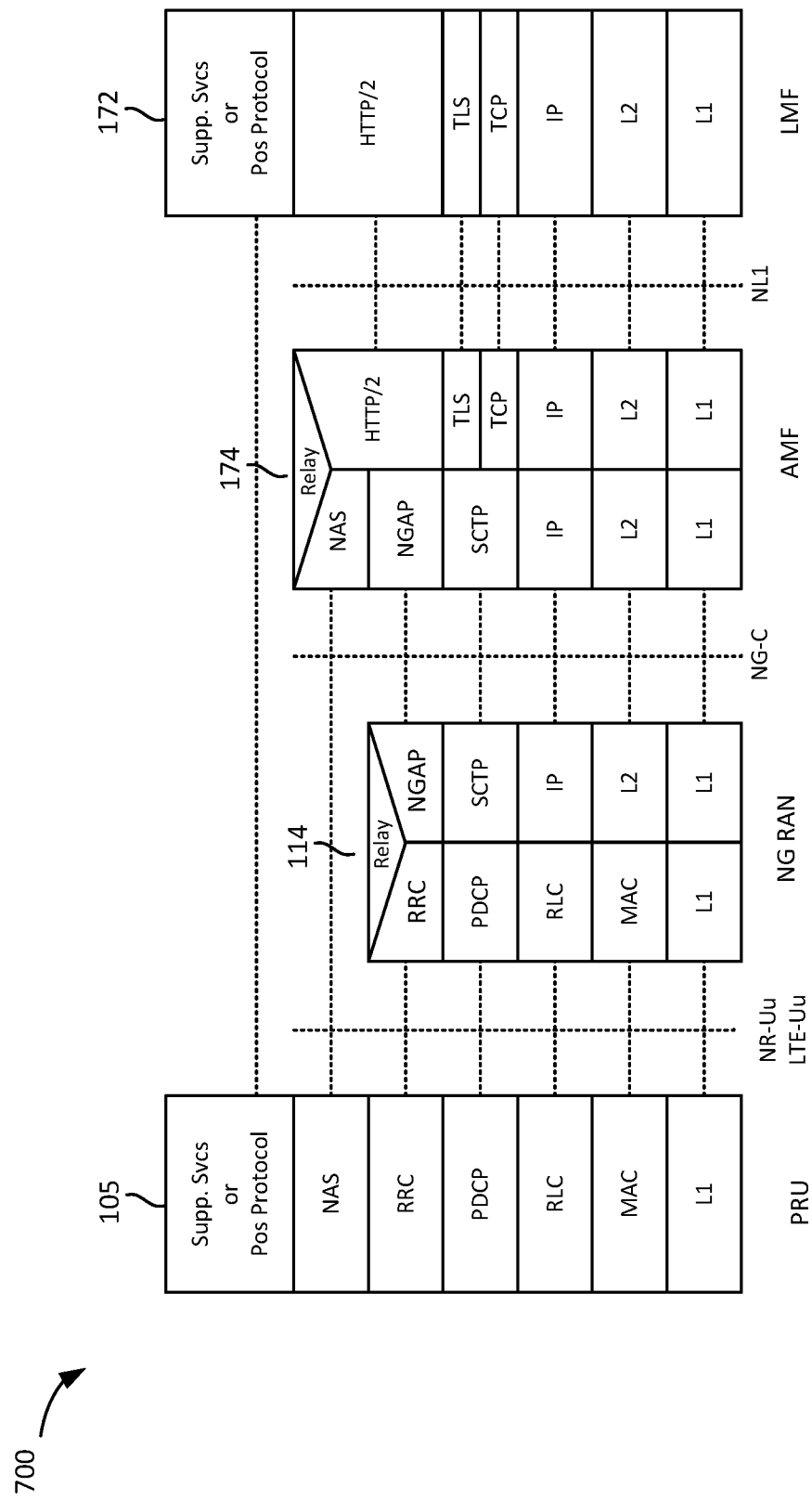
FIG. 7 is a diagram of a protocol stack, according to aspects of the disclosure.

FIG. 7 is a diagram 700 illustrating a possible protocol layering for LMF 172 to PRU 105 signaling, according to aspects of the disclosure. A PRU 105 interacts with an LMF 172 using the protocol layering shown, which is the same protocol layering defined in 3GPP TS 38.305 clause 6.4.1 for LMF to UE interaction except for allowing a supplementary services protocol and other positioning protocols besides LPP to be used between an LMF 172 and a PRU 105 at the top level. As illustrated, the top protocol layer between the PRU 105 and the LMF 172 is a supplementary services protocol (e.g. such as defined in 3GPP TS 24.080) or a positioning protocol (e.g. LPP or NRPPa). Both protocols might be used in some cases, e.g., where a supplementary services message includes one or more embedded positioning protocol messages.

Figure 8:
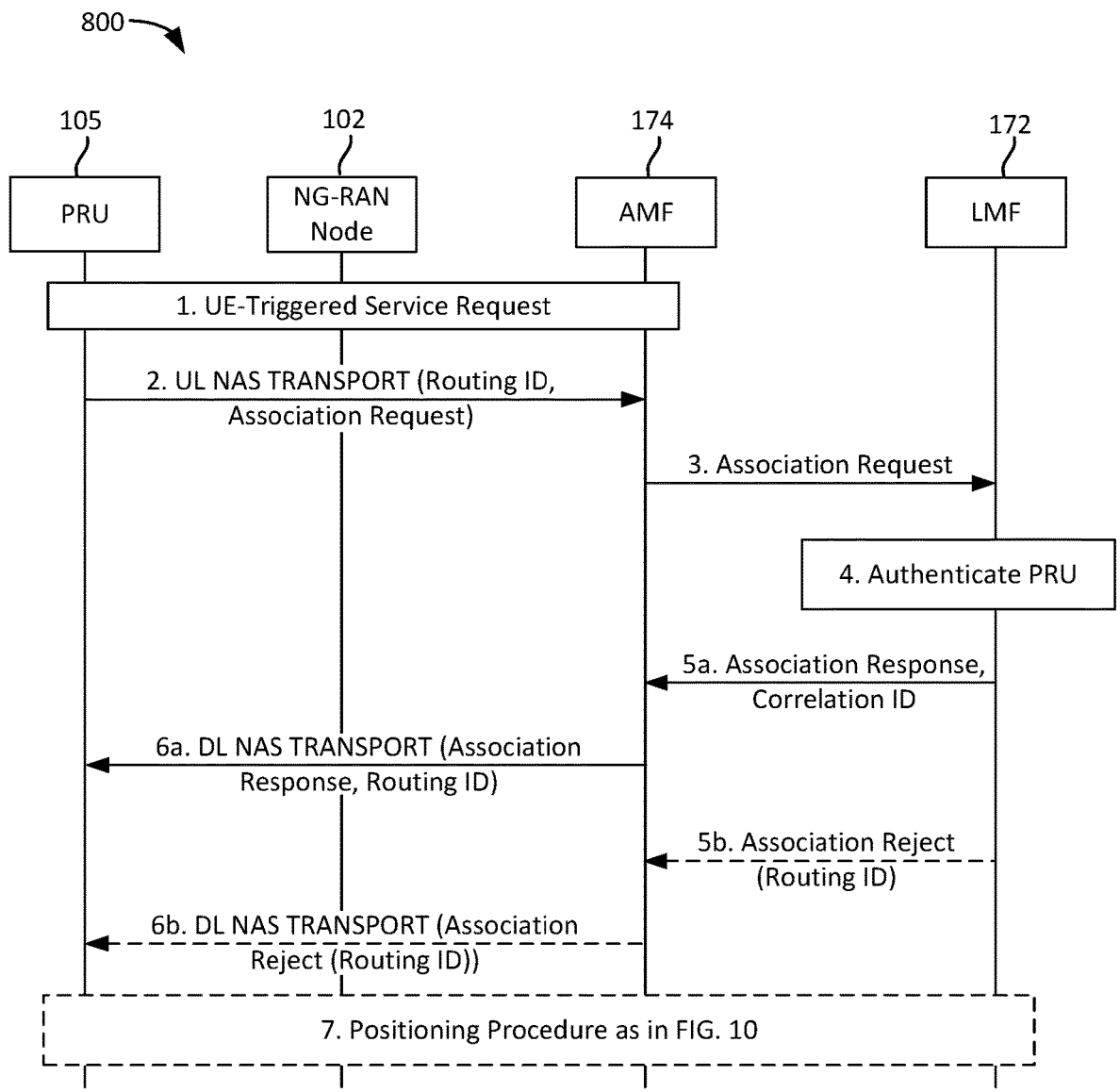
FIG. 8 illustrates an example PRU positioning operation for an association procedure for the PRU, according to aspects of the disclosure.

FIG. 8 illustrates an example PRU positioning operation 800 for an association procedure for the PRU 105 to register, or associate, with an LMF 172. The procedure may be used for initial association when a PRU 105 first starts to access its associated PLMN, e.g., following an initial deployment and initial power-on and after PRU 105 has registered with its associated PLMN, e.g. has registered with AMF 174. The procedure can also be used subsequently to perform an association update to inform the LMF 172 of the continued availability of the PRU 105 or to inform the LMF 172 of some change to the PRU 105 such as a change of location (e.g. a change of tracking area or change of serving AMF 174) or change of the PRU 105 positioning capabilities.

The PRU 105 may associate with more than one LMF 172 to enable multiple LMFs to obtain location related information from or for the PRU 105. This is no different to a normal target UE being positioned by different LMFs (e.g. at the same time or at different times). A PRU 105 may be configured with a limit on the number of LMFs that it is allowed to associate with. When a PRU 105 receives a conflicting location related request from an LMF 172 (e.g. a request to obtain measurements at the same time as obtaining measurements for another LMF), the PRU 105 can reject the request. The sharing of a PRU 105 by several LMFs might occur in a border area between areas supported by the different LMFs.

For initial association of the PRU 105, a Routing Identifier may be configured in the PRU 105 indicating a particular LMF 172. For subsequent Association, a Routing ID indicating an LMF 172 would have been returned to the PRU 105 at stage 6a or 6b of a previous Association. As used herein, a Correlation ID and a Routing ID are different terms for the same identity. The term "Correlation ID" is used for NL1 service operations between an AMF 174 and LMF 172 while the term "Routing ID" is used for a NAS message sent over the N1 reference point between a PRU 105 and AMF 174.

At stage 1, the PRU 105 performs a UE Triggered Service Request if in CM IDLE state.

At stage 2, the PRU 105 sends a supplementary services Association Request (which may also be referred to as a supplementary services Registration Request) to the serving AMF 174 in an UL NAS TRANSPORT message and includes the preconfigured Routing ID for an initial Association or the Routing ID received at stage 6a or stage 6b for the previous Association. The Association Request may be a supplementary services message and/or a location services message and may be defined in 3GPP TS 24.080. The Association Request may be included in the UL NAS TRANSPORT message inside a "Location services message container" at the NAS level which means that an AMF 174 can transfer the message to the LMF at stage 3 without a new AMF 174 impact. The Association Request may include an identity for the PRU 105 (e.g. a SUPI, a PEI or a serial number), a reason for the Association (e.g. initial Association, an Association update, a manually invoked Association), a location of the PRU 105 if available, optional authentication information, a type of PRU 105 (e.g. whether the PRU 105 is fixed or mobile) and capabilities of the PRU 105. The capabilities can include capabilities to perform positioning activities associated with an NG-RAN node 102 and/or positioning activities associated with a UE. Capabilities to perform positioning activities associated with an NG-RAN node 102 may be indicated by including one or more embedded NRPPa messages as defined in 3GPP TS 38.455 in the Association Request. Capabilities to perform positioning activities associated with a UE may be indicated by including one or more embedded LPP messages as defined in 3GPP TS 37.355 in the Association Request.

At stage 3, the AMF 174 selects an LMF 172 based on the Routing ID and transfers the Association Request to the LMF 172. The LMF 172 may be selected based on the Routing ID and the current TAI and/or CGI for PRU 105.

The AMF 174 may see the PRU 105 as just a normal UE. However, an operator can assign reserved Routing IDs to a PRU 105 different to Routing IDs used for other UEs. For example, all PRUs 105 that act as PRUs might be configured with a Routing ID A and all PRUs 105 that act as Reference UEs might be configured with a Routing ID B. The operator can then configure these Routing IDs in an AMF 174 such that the AMF 174 selects a preferred LMF 172 for Routing ID A and the same or a different preferred LMF 172 for the Routing ID B. This may not require any new functionality in an AMF 174.

At stage 4, the LMF 172 authenticates the PRU 105 and verifies that it is a legitimate for this PLMN. This may use one of the following methods.

Method A: The AMF 174 includes the SUPI of the PRU 105 at stage 3 and the LMF 172 verifies that the SUPI matches a subscription permanent identifier (SUPI) of a legitimate PRU 105 configured in the LMF 172.

Method B: The PRU 105 includes an identification and authentication information at stage 2 which the LMF 172 verifies against expected authentication information configured in the LMF 172 for a PRU 105 with this identification. The authentication information might include a ciphering of the PRU 105 identity and/or a current date and time (e.g., UTC) based on a private key stored in secure memory of the PRU 105.

Method C: The LMF 172 sends an authentication challenge to the PRU 105 via the AMF 174 as a DL supplementary services message and receives an authentication response from the PRU 105 sent as a UL supplementary services message, where the authentication response is based on a private ciphering key held in secure memory in the PRU 105.

Method D: At stage 3, the AMF 174 sends an indication of whether the source of the Association Request (in this case the PRU 105) is (or is not) a PRU or PRU to the LMF 172. The indication and the Association Request may both be transferred by the AMF 174 to the LMF 172 at stage 3, e.g. using a service operation based on the Hypertext Transfer Protocol (HTTP). The indication may be obtained by AMF 174 from UE subscription data for PRU 105, which may be transferred to AMF 174 from UDM 171 when or just after PRU 105 has associated with AMF 174, e.g. prior to stage 1. AMF 174 may further verify that PRU 105 is not roaming such that a UDM for PRU 105 (in this case UDM 171) belongs to the same PLMN as AMF 174. If that is not the case (i.e. PRU 105 is roaming), then AMF 174 may ignore any PRU indication in the UE subscription data for PRU 105 and may indicate to LMF 172 that PRU 105 is not a PRU. AMF 174 may otherwise send the indication from the UE subscription data along with the Association Request to LMF 172. AMF 174 may not be aware that the message being transferred to LMF 172 is a supplementary services Association Request since that could require decoding and interpreting the supplementary Association Request message by AMF 174. Instead, for every supplementary services location message sent by a UE 104 or PRU 105 that is forwarded by AMF 174 to LMF 172, AMF 174 may determine whether that UE 104 or PRU 105 is or is not a PRU from UE subscription data for the UE 104 or PRU 105 and include an indication of whether the UE 104 or PRU 105 is a PRU along with the supplementary services location message that AMF 174 forwards to the LMF 172. This may avoid AMF 174 needing to decode and interpret the supplementary services location message that is being transferred to LMF 172. LMF 172 can then authenticate PRU 105 by whether or not an indication of being a PRU was included with the Association Request received by LMF 172 at stage 3. If LMF 172 receives an indication that PRU 105 is a PRU at stage 3, then LMF can assume that PRU 105 is a legitimate PRU (i.e. is authenticated). Otherwise, LMF can assume that PRU 105 is not a legitimate PRU (i.e. is not authenticated).

At stage 5a, if the LMF 172 is able to authenticate the PRU 105 at stage 4 and can accept the Association, the LMF 172 returns an Association Response (which may also be referred to as a Registration Response) to the serving AMF 174 as a location services supplementary services message and includes a Correlation ID. The Correlation ID is assigned by the LMF 172 to identify the LMF 172 and the PRU 105. The Association Response may indicate conditions for performing another Association with the LMF 172 (e.g. a periodic Association timer or Association based on a change of location, change of Tracking Area Identifier (TAI) or change of serving AMF 174 for the PRU 105). The Association Response may also provide Routing IDs for additional LMFs with each of which the PRU 105 shall perform a separate Association.

A PRU 105 may be fixed with a new Association of the PRU 105 only needed at long periodic intervals. A PRU 105 could instead be mobile (e.g. attached to a vehicle), with a new Association then minimally needed whenever the serving AMF 174 changes to enable the LMF 172 to reach the PRU 105 for the procedures described in FIGS. 9 and 10. If the LMF 172 selected by the new AMF 174 then changes, the previous LMF 172 would discover this from an error response from the previous AMF 174 when instigating the procedure in FIG. 9 or 10.

At stage 6a, the serving AMF 174 forwards the Association Response and a Routing ID equal to the Correlation ID to the PRU 105. The PRU 105 stores the Routing which is used for any repeated Association with this LMF 172. If Routing IDs for other LMFs are included in the Association Response, the PRU 105 performs an Association with each of these LMFs.

At stage 5b, if the LMF 172 is unable to authenticate the PRU 105 at stage 4 or cannot accept the Association for some other reason (e.g. the LMF 172 is the wrong LMF), the LMF 172 sends an Association Reject to the serving AMF 174 and may include the Routing ID of another LMF with which the PRU 105 shall perform an Association.

At stage 6b, the serving AMF 174 forwards the Association Reject to the PRU 105. If a Routing ID is included, the PRU 105 performs an Association with the LMF associated with this Routing ID.

The PRU 105 may be configured with a limit on the number or duration of Association attempts performed unsuccessfully. When this limit is reached, the PRU 105 may send an indication to some entity in the PLMN. The indication might be a text message or an HTTPS message, for example.

Figure 10:
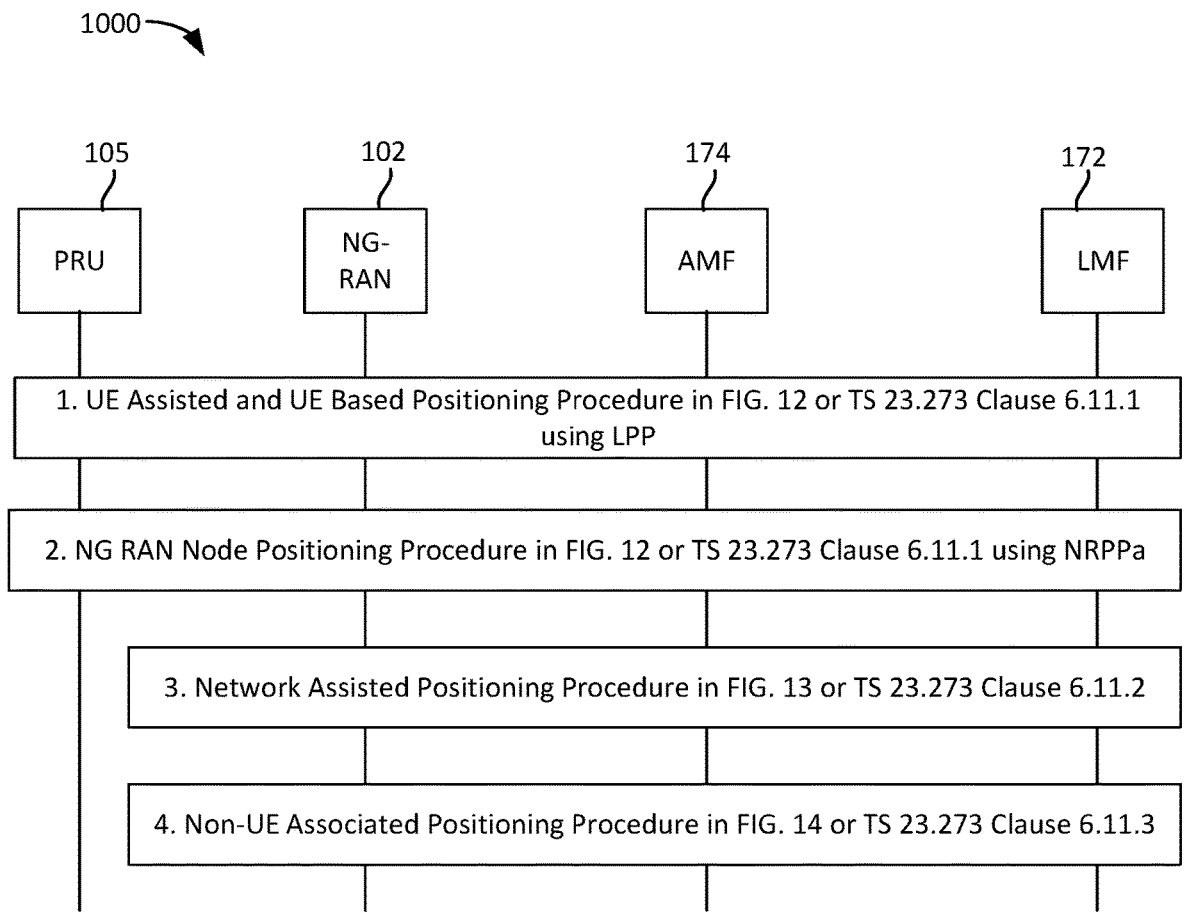
FIG. 10 illustrates an example PRU positioning operation for a positioning procedure to obtain location related information from or for a PRU, according to aspects of the disclosure.

At stage 7, if Association is performed successfully as in stages 5a and 6a, the LMF 172 may optionally instigate positioning procedures for the PRU 105 as described in FIG. 10. For example, the positioning procedures may be used to obtain or verify a location of the PRU 105 or obtain the positioning capabilities of the PRU 105.

Figure 9:
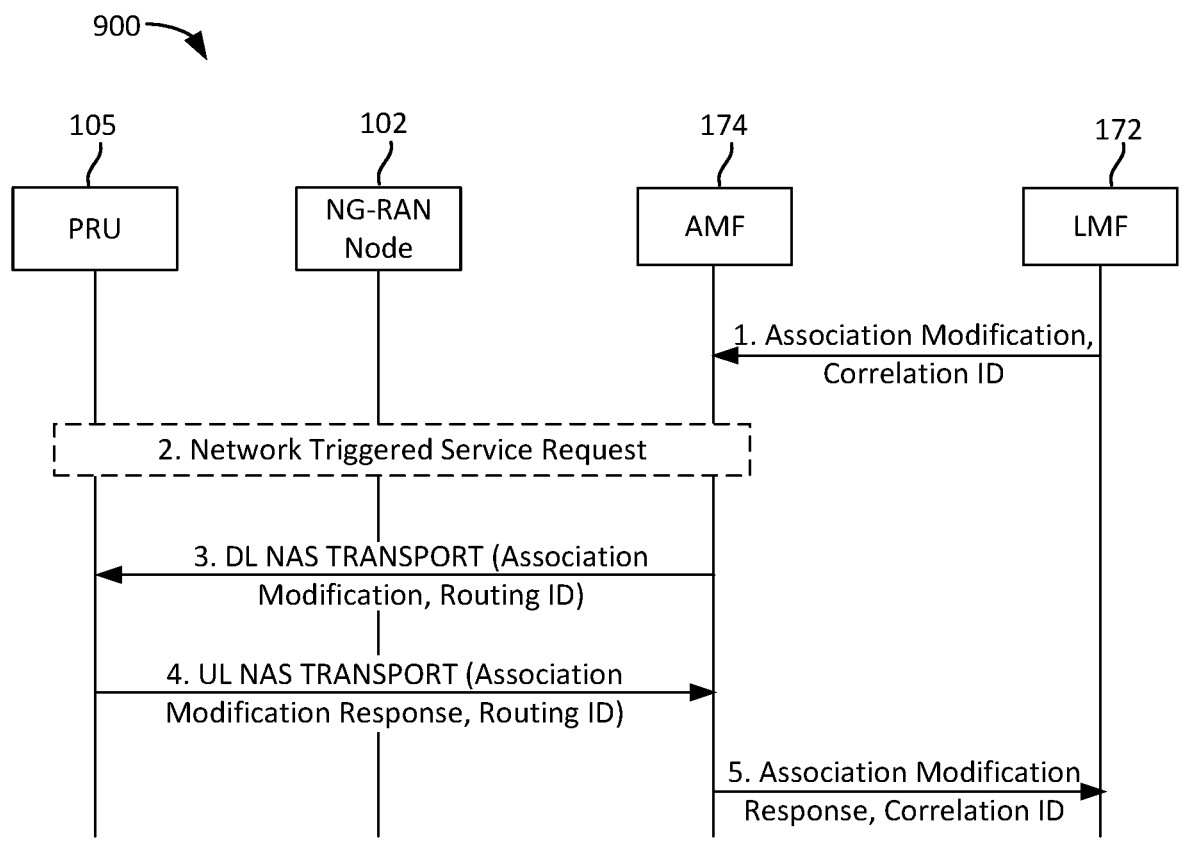
FIG. 9 illustrates an example PRU positioning operation for an association modification procedure for the PRU, according to aspects of the disclosure.

FIG. 9 illustrates an example PRU positioning operation 900 for an Association Modification procedure used by an LMF 172 to change the Association status of a PRU 105. The change in status can include disassociating the PRU 105, changing the conditions for sending Association updates by the PRU 105 or requesting the PRU 105 to associate with additional LMFs. The Association Modification procedure illustrated in FIG. 9 presumes that the PRU 105 has previously successfully associated with the LMF 172, e.g. using the procedure in FIG. 8.

At stage 1, the LMF 172 send an Association Modification to the serving AMF 174 as a location services supplementary services message and includes the identity of the PRU 105 (e.g. the SUPI) and a Correlation ID identifying the LMF 172 and the PRU 105. The Association Modification may indicate to the PRU 105 new conditions for performing Association updates with the LMF 172 (e.g. a periodic Association timer or Association based on a change of location for the PRU 105). The Association Modification may also provide Routing IDs for other LMF 172 s with each of which the PRU 105 shall perform a separate Association. The Association Modification may further indicate a disassociation of the PRU 105 with the LMF 172.

At stage 2, if the PRU 105 is in CM IDLE state, the serving AMF 174 performs a Network Triggered service request to place the PRU 105 in CM CONNECTED state.

At stage 3, the serving AMF 174 forwards the Association Modification and a Routing ID equal to the Correlation ID to the PRU 105.

At stage 4, the PRU 105 returns a supplementary services Association Modification response to the serving AMF 174 in an UL NAS TRANSPORT message and includes the Routing ID received in stage 3. The Association Modification response confirms receipt of the information in the Association Modification at stage 3.

At stage 5, the serving AMF 174 forwards the Association Modification response to the LMF 172 indicated by the Routing ID received at stage 4 and includes a Correlation ID equal to the Routing ID.

FIG. 10 illustrates an example PRU positioning operation 1000 for a positioning procedure used by an LMF 172 to obtain location related information from or for a PRU 105.

The positioning procedure illustrated in FIG. 10 assumes that the PRU 105 has previously successfully associated with the LMF 172, e.g. using the procedure in FIG. 8.

Figure 12:
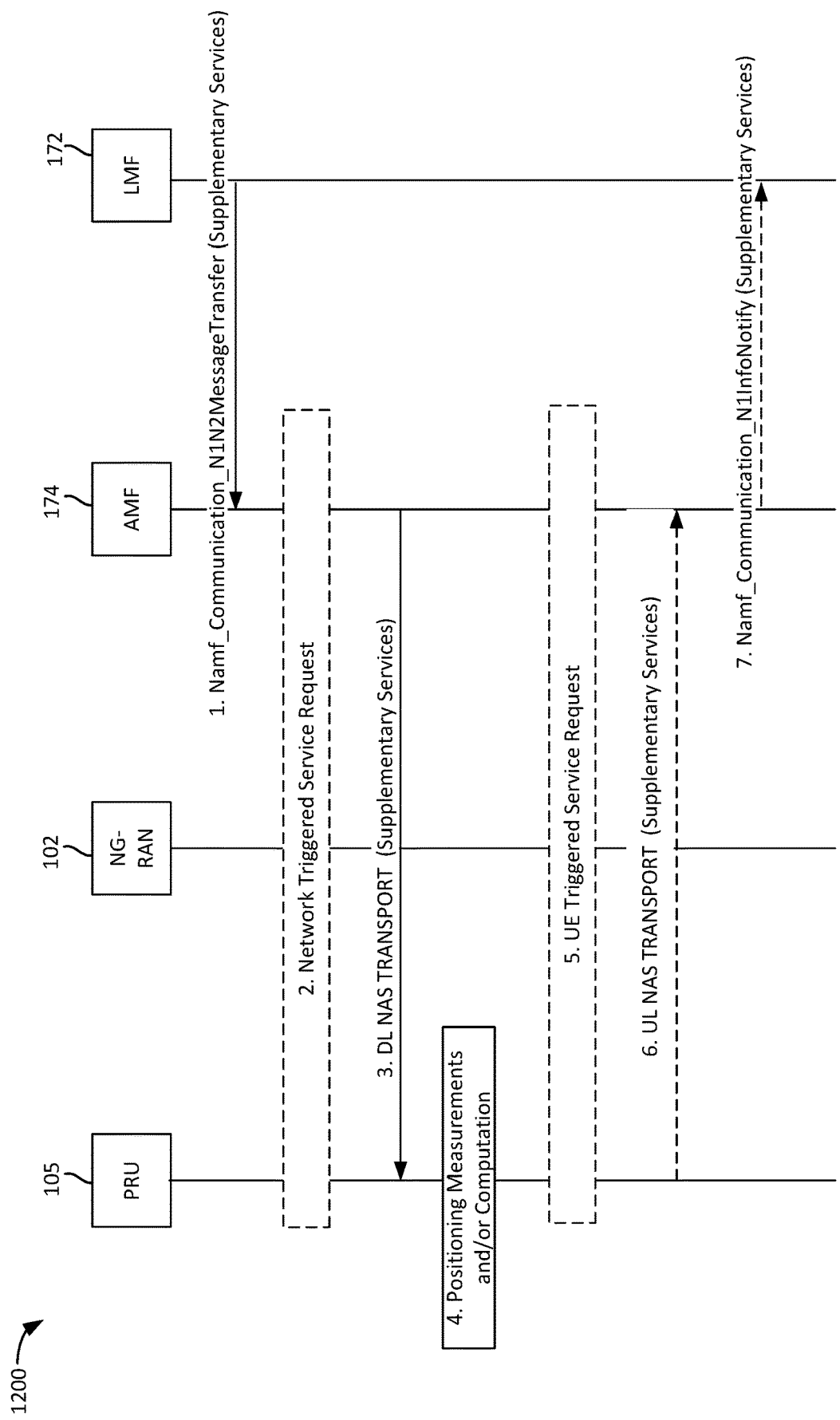
FIG. 12 illustrates an example PRU positioning operation for a positioning procedure to support PRU based positioning, PRU assisted positioning, and delivery of assistance data, according to aspects of the disclosure.

At stage 1, the LMF 172 may use the UE Assisted and UE Based Positioning Procedure as illustrated in FIG. 12, or the procedure defined in 3GPP TS 23.273 Clause 6.11.1, to request positioning capabilities from, provide assistance to or request location measurements from a PRU 105 when functioning as a target UE.

At stage 2, the LMF 172 may use the UE Assisted and UE Based Positioning Procedure as illustrated in FIG. 12, or the procedure defined in 3GPP TS 23.273 Clause 6.11.1, to send location related information to or request location related information from a PRU 105 when supporting functions of an NG-RAN node. The procedure in FIG. 12 or defined in 3GPP TS 23.273 clause 6.11.1 is used to exchange NRPPa messages with the PRU 105, where the DL Positioning message in steps 1 and 3 of FIG. 6.11.1-1 in 3GPP TS 23.273 clause 6.11.1 and the UL Positioning message in steps 6 and 7 of FIG. 6.11.1-1 in 3GPP TS 23.273 clause 6.11.1 are each replaced by a location services supplementary services message carrying an embedded NRPPa message, as illustrated in stages 1 and 3 and in stages 6 and 7 in FIG. 12.

Figure 13:
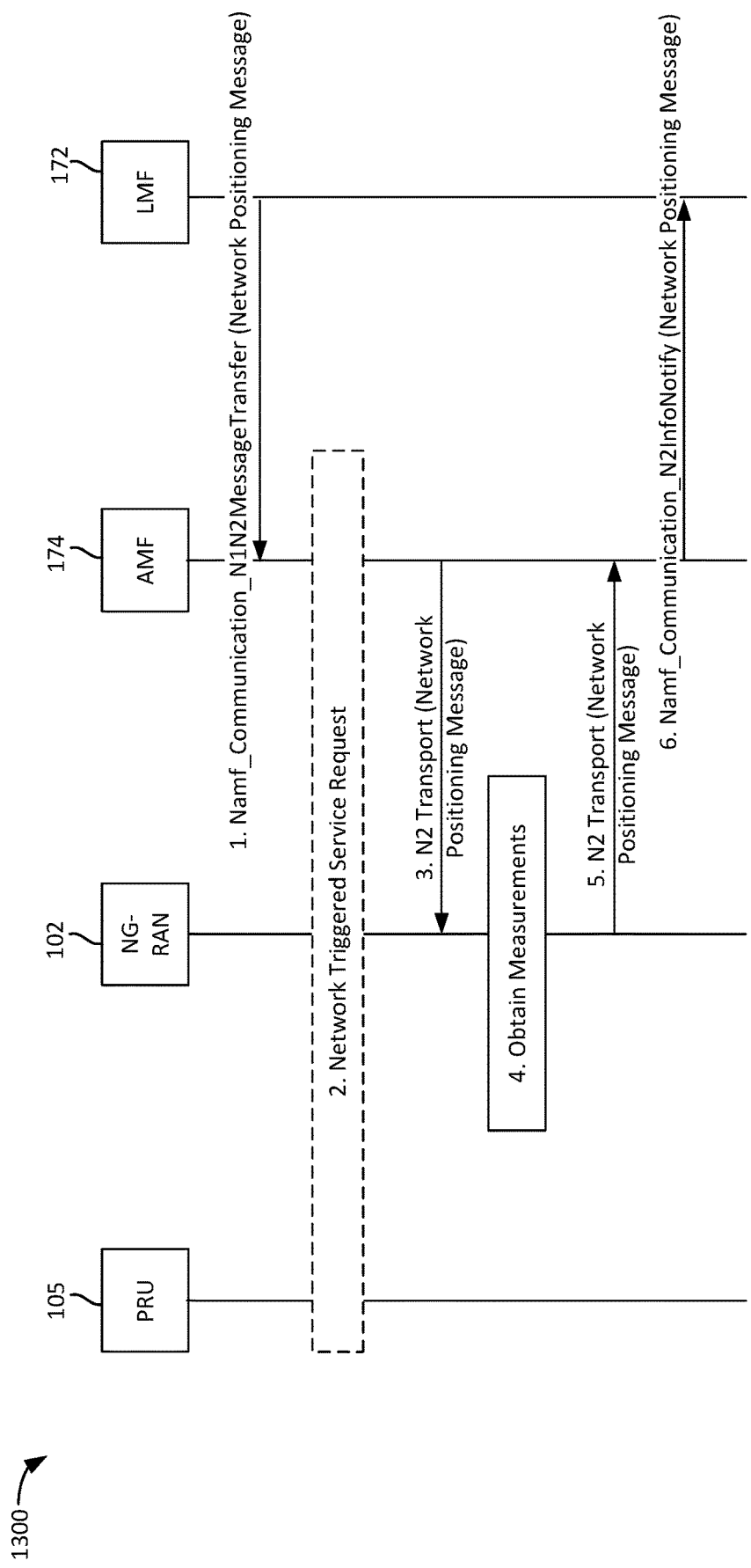
FIG. 13 illustrates an example PRU positioning operation for a network assisted positioning procedure, according to aspects of the disclosure.

At stage 3, the LMF 172 may use the Network Assisted Positioning Procedure as illustrated in FIG. 13, or the procedure defined in 3GPP TS 23.273 Clause 6.11.2, to send or request location information related to the PRU 105 to or from the serving NG-RAN node for the PRU 105.

Figure 14:
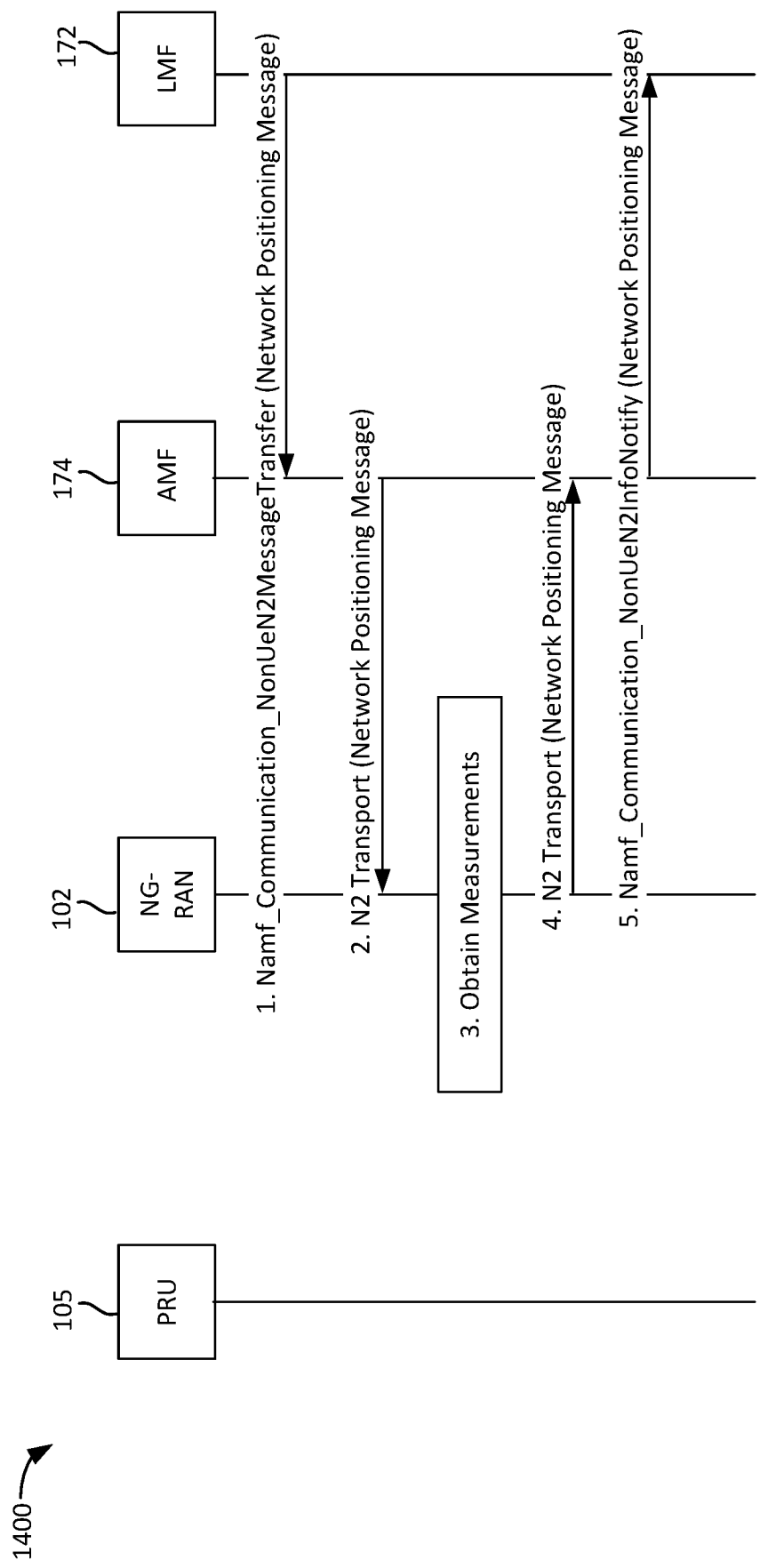
FIG. 14 illustrates an example PRU positioning operation for obtaining non-UE associated network assistance data, according to aspects of the disclosure.

At stage 4, the LMF 172 may use the Obtaining Non-UE Associated Network Assistance Data procedure as illustrated in FIG. 14, or the procedure defined in 3GPP TS 23.273 Clause 6.11.3, to send or request location information related to the PRU 105 to or from one or more NG-RAN nodes.

Figure 11:
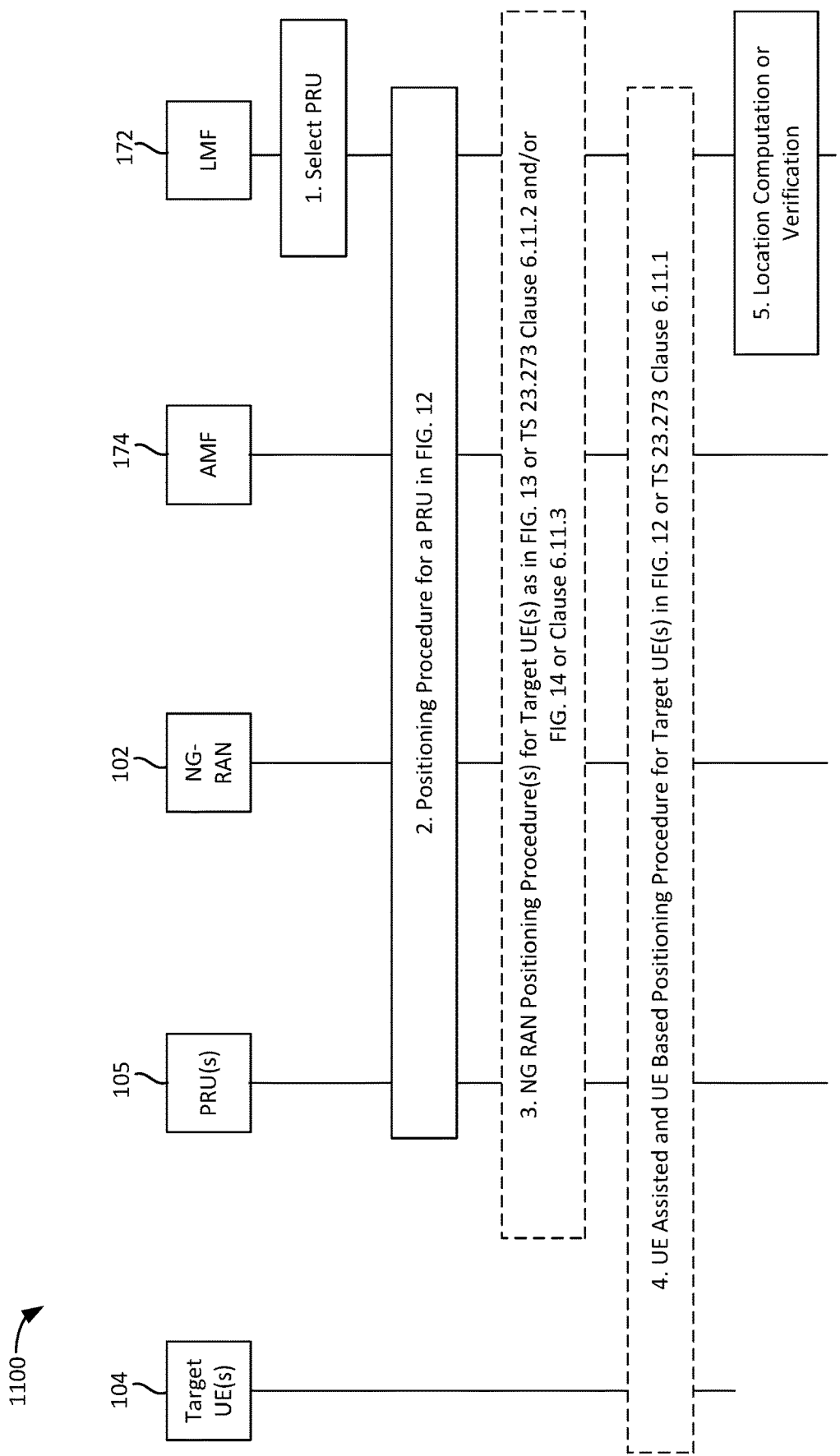
FIG. 11 illustrates an example PRU positioning operation for a positioning a target user equipment (UE) using a PRU, according to aspects of the disclosure.

FIG. 11 illustrates an example PRU positioning operation 1100 for positioning a target UE 104 using a PRU 105, e.g., operating as a Reference UE as used by an LMF 172 to obtain location related information for one or more target UEs. In the procedure illustrated in FIG. 11, the LMF 172 has already received a location request for the target UE(s) 104, e.g., from a common serving AMF 174 for the target UE(s) 104.

In the procedure 1100 illustrated in FIG. 11, the LMF 172 uses one or more PRUs 105 (e.g., operating as Reference UEs) to assist in positioning of the target UE(s).

At stage 1, the LMF 172 selects one or more PRUs 105 (e.g. Reference UEs) that is(are) nearby to the target UE(s) 104. Criteria for selecting a PRU 105 can include: a known current or previous location for the PRU 105 that is nearby to an approximate location for one or more of the target UE(s) 104; a current or last known serving cell for the PRU 105 that is the same as or nearby to a serving cell or serving cells for one or more of the target UE(s) 104; positioning capabilities for the PRU 105 that can be used to support positioning capabilities of the target UE(s) 104; a serving or visible non-3GPP node (e.g. a WLAN node) that is also a serving or visible non-3GPP node for one or more of the target UE(s) 104.

At stage 2, the LMF 172 uses the positioning procedure in FIG. 12 to request each PRU 105 selected at stage 1 to obtain and return measurements of positioning signals transmitted by the target UE(s) 104 and/or to transmit positioning signals (e.g. DL PRS or SL PRS) to be measured by the target UE(s) 104.

At stage 3, the LMF 172 may use the Network Assisted Positioning Procedure as illustrated in FIG. 13, or the procedure defined in 3GPP TS 23.273 Clause 6.11.2, and/or the Obtaining Non-UE Associated Network Assistance Data procedure as illustrated in FIG. 14, or the procedure defined in 3GPP TS 23.273 Clause 6.11.3, to support positioning of the target UE(s) 104 using one or more NG-RAN nodes 102.

At stage 4, the LMF 172 may use the UE Assisted and UE Based Positioning Procedure as illustrated in FIG. 12, or the procedure defined in 3GPP TS 23.273 Clause 6.11.1, to support UE Assisted and/or UE Based Positioning of the target UE(s) 104.

At stage 5, the LMF 172 computes or verifies a location of each of the target UE(s) 104 using information received in stages 2-4.

FIG. 12 illustrates an example PRU positioning operation 1200 for a positioning procedure used by an LMF 172 to support PRU based positioning, PRU assisted positioning and delivery of assistance data. The procedure may be used by an LMF 172 to obtain positioning measurements from a PRU 105, where the positioning measurements are obtained by the PRU 105 and are provided to the LMF 172, and where the LMF 172 uses the positioning measurements to determine a location of the PRU 105. The procedure may also be used by an LMF 172 to obtain positioning measurements from a PRU 105, where the positioning measurements are obtained by the PRU 105 of signals (e.g. SL-PRS or UL SRS) transmitted by one or more target UEs 104 (not shown in FIG. 12) and are provided to the LMF 172, and where the LMF 172 uses the positioning measurements to determine location(s) of the one or more target UEs 104.

The procedure is based on use of a supplementary services protocol (e.g. a protocol defined in 3GPP TS 24.080) carrying NRPPa messages between the LMF and PRU when the PRU functions as an NG-RAN node. The procedure is based on use of LPP messages between the LMF and PRU when the PRU functions as a target UE. An LCS Correlation identifier and the serving AMF 174 identity for the PRU are also assumed to have been passed to the LMF 172 by the serving AMF 174. The procedure is first described for the case where the PRU functions as an NG-RAN node.

At stage 1 in FIG. 12, the LMF 172 invokes the Namf_Communication_N1N2MessageTransfer service operation towards the AMF 174 to request the transfer of a location services supplementary service message carrying an embedded NRPPa message to the PRU 105. The Session ID parameter of the Namf_Communication_N1N2MessageTransfer service operation is set to the LCS Correlation identifier. The embedded NRPPa message may request location information from the PRU 105, provide assistance data to the PRU 105, query for the PRU 105 capabilities of the PRU 105, or request transmission of UL SRS or DL PRS by the PRU.

At stage 2, if the PRU 105 is in CM IDLE state, the AMF 174 initiates a network triggered Service Request procedure to establish a signaling connection with the PRU 105.

At stage 3, the AMF 174 forwards the location services supplementary service message carrying the embedded NRPPa message to the PRU 105 in a DL NAS TRANSPORT message. The AMF 174 includes a Routing identifier, in the DL NAS TRANSPORT message, which is set to the LCS Correlation identifier. The supplementary service message may request the PRU 105 to response to the network, e.g. may request the PRU 105 to acknowledge the supplementary service message, to return location information or to return capabilities.

At stage 4, the PRU 105 stores any assistance data provided in the NRPPa message, performs any positioning measurements and/or location computation requested by the NRPPa message and/or transmits any DL PRS or UL SRS signals requested by the NRPPa message. The positioning measurements obtained at stage 4 may be of signals (e.g. UL SRS or SL-PRS) transmitted by one or more target UEs 104 (not shown in FIG. 12) when location(s) are needed for the one or more target UEs 104, or may be of signals transmitted by other PRUs 105 (not shown in FIG. 12), base stations in NG-RAN 112 (e.g. gNBs 102) and/or other signal sources (e.g. SVs 112) when a location is needed for the PRU 105.

At stage 5, if the PRU 105 has entered CM-IDLE state during stage 4 and needs to respond to the request received in stage 3, the PRU 105 instigates a UE triggered Service Request in order to establish a signaling connection with the AMF 174.

At stage 6, which is conditional, the PRU 105 sends to the AMF 174 a location services supplementary service message carrying an embedded NRPPa response message included in an UL NAS TRANSPORT message, e.g. to acknowledge the NRPPa message received in stage 3, to return any location information obtained at stage 4, return any capabilities as requested at stage 3, or provide information on or confirm any transmission of DL PRS or UL SRS at stage 4. When the PRU 105 sends the supplementary service message in the UL NAS TRANSPORT message, the PRU 105 also includes in the UL NAS TRANSPORT message the Routing identifier received in stage 3.

At stage 7, which is conditional, the AMF 174 invokes the Namf_Communication_N1MessageNotify service operation towards the LMF 172 indicated by the routing identifier received in stage 6. The service operation includes the location services supplementary service message carrying the embedded NRPPa response message received in stage 6 and the LCS Correlation identifier. Stages 6 and 7 may be repeated if the PRU 105 needs to send multiple supplementary service messages to respond to the request received in stage 3. Stages 1 to 7 may be repeated to send new assistance data, request further location information, request further PRU 105 capabilities and/or start or stop transmission of DL PRS or UL SRS.

When the PRU 105 functions as a target UE, the procedure in FIG. 12 may also be used, but LPP or sidelink positioning protocol (SLPP) messages are then transferred at stages 1, 3, 6 and 7 instead of supplementary services messages with an embedded NRPPa message. In addition: (i) an SLPP or LPP message sent at stage 1 may request location information from the PRU 105, provide assistance data to the PRU 105, query for the target UE capabilities of the PRU 105, or request transmission of UL SRS or SL PRS by the PRU 105; (ii) at stage 4, the PRU 105 may store any assistance data provided in the LPP or SLPP message, perform any positioning measurements and/or location computation requested by the LPP or SLPP message and/or transmit any UL SRS or SL PRS signals requested by the LPP or SLPP message; and (iii) at stage 6, the PRU 105 may send to the AMF 174 an LPP or SLPP message response (included in an UL NAS TRANSPORT message), e.g. to acknowledge the LPP or SLPP message received in stage 3, to return any location information obtained at stage 4, return any capabilities as requested at stage 3, or provide information on or confirmation of any transmission of UL SRS or SL PRS at stage 4. The procedure just described, where the PRU 105 functions as a target UE, may also be used by LMF 172 to support positioning of a target UE 104 (instead of a PRU 105) where the target UE 104 then replaces the PRU 105 in FIG. 12.

FIG. 13 illustrates an example PRU positioning operation 1300 for a network assisted positioning procedure to support network assisted and network based positioning. The procedure may be based on an NRPPa protocol between the LMF 172 and NG-RAN node 102. An LCS Correlation identifier and the AMF 174 identity have been passed to the LMF 172 by the serving AMF 174.

At stage 1, the LMF 172 invokes the Namf_Communication_N1N2MessageTransfer service operation towards the AMF 174 to request the transfer of a Network Positioning message (e.g. NRPPa message) to the serving NG-RAN node 102 (e.g. gNB) for the PRU 105. The service operation includes the Network Positioning message and the LCS Correlation identifier. The Network Positioning message may request location information for the PRU 105 from the NG-RAN node 102.

At stage 2, if the PRU 105 is in CM IDLE state, the AMF 174 initiates a network triggered Service Request procedure to establish a signaling connection with the PRU 105.

At stage 3, the AMF 174 forwards the Network Positioning message to the serving NG-RAN node 102 in an N2 Transport message. The AMF 174 includes a Routing identifier, in the N2 Transport message, identifying the LMF 172 (e.g. a global address of the LMF 172).

At stage 4, the serving NG-RAN node 102 obtains any location information for the PRU 105 requested in stage 3.

At stage 5, the serving NG-RAN node 102 returns any location information obtained in stage 4 to the AMF 174 in a Network Positioning message (e.g. an NRPPa message) included in an N2 Transport message. The serving NG-RAN node 102 shall also include the Routing identifier in the N2 Transport message received in stage 3.

At stage 6, the AMF 174 invokes the Namf_Communication_N2InfoNotify service towards the LMF 172 indicated by the routing identifier received in stage 5. The service operation includes the Network Positioning message received in stage 5 and the LCS Correlation identifier. Steps 1 to 6 may be repeated to request further location information and further NG-RAN capabilities.

The procedure in FIG. 13 may also be used to perform positioning of a target UE 104 instead of a PRU 105, with the target UE 104 then replacing the PRU 105 in FIG. 13.

FIG. 14 illustrates an example PRU positioning operation 1400 for obtaining non-UE associated network assistance data in a procedure which may be used by an LMF 172 to support network assisted and network-based positioning. This procedure is not associated with a UE location session. It is used to obtain network assistance data from an NG-RAN node 102 (e.g. gNB). The procedure may be based on an NRPPa protocol between the LMF 172 and NG-RAN node 102.

At stage 1, the LMF 172 invokes the Namf_Communication_NonUeN2MessageTransfer service operation towards the AMF 174 to request the transfer of a Network Positioning message (e.g. NRPPa message) to a NG-RAN node 102 (gNB or ng-eNB) in the NG-RAN. The service operation includes the Network Positioning message and the target NG-RAN node 102 identity. The Network Positioning message may request position related information from the NG-RAN.

At stage 2, the AMF 174 forwards the Network Positioning message to the target NG-RAN node 102 indicated in stage 1 in an N2 Transport message. The AMF 174 includes a Routing identifier, in the N2 Transport message, identifying the LMF 172.

At stage 3, the target NG-RAN node 102 obtains any position related information requested in stage 2.

At stage 4, the target NG-RAN node 102 returns any position related information obtained in stage 3 to the AMF 174 in a Network Positioning message (e.g. NRPPa message) included in an N2 Transport message. The target NG-RAN node 102 also includes the Routing identifier in the N2 Transport message received in stage 2.

At stage 5, the AMF 174 invokes the Namf_Communication_NonUeN2InfoNotify service operation towards the LMF 172 indicated by the routing identifier received in stage 4. The service operation includes the Network Positioning message received in stage 4. Stages 1 to 5 may be repeated to request further position related information from the NG-RAN.

The procedure in FIG. 14 may also be used to perform positioning of a target UE 104 instead of a PRU 105, with the target UE 104 then replacing the PRU 105 in FIG. 14.

Figure 15:
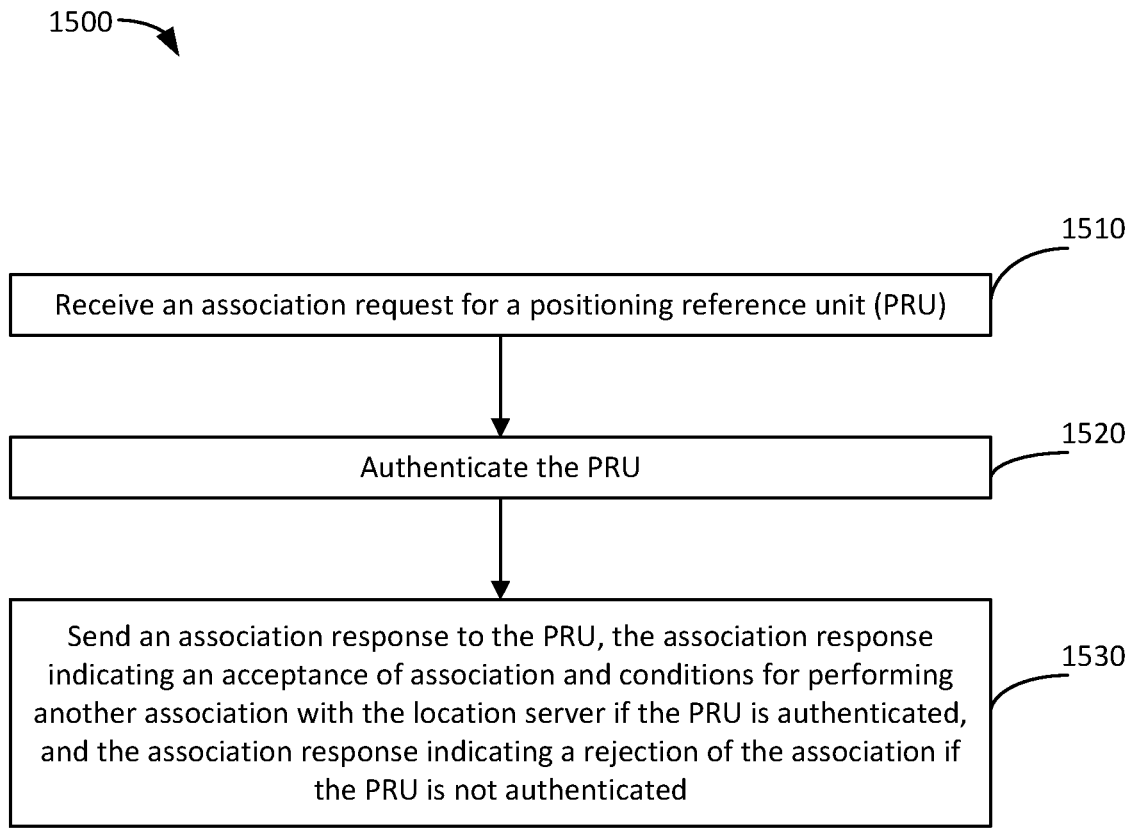
FIG. 15 illustrates a flow chart of an exemplary method for supporting positioning performed by a location server, according to aspects of the disclosure.

FIG. 15 illustrates a flowchart of an exemplary method 1500 for supporting positioning in a wireless network performed by a location server (e.g., LMF 172 or network entity 206).

Figure 17:
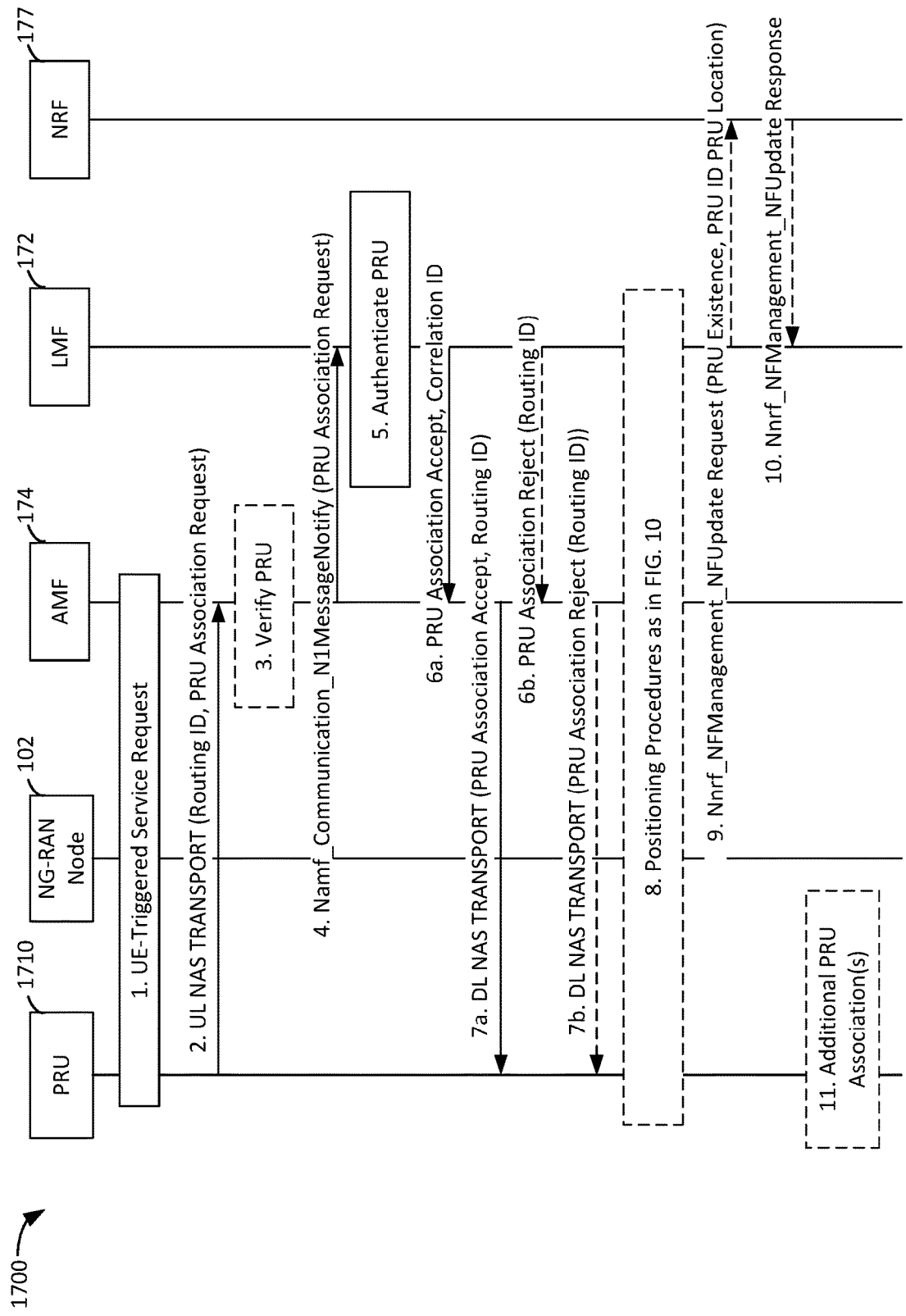
FIG. 17 illustrates an example PRU association procedure, according to aspects of the disclosure.

At block 1510, the location server receives an association request for a positioning reference unit (PRU) (e.g., PRU 105), e.g., as discussed in stage 3 of FIG. 8 and stage 4 of FIG. 17. The PRU, for example, may be one of a Positioning Reference Unit (PRU), reference User Equipment (UE), Roadside Unit (RSU), or Global Navigation Satellite System (GNSS) reference receiver. In an aspect, the at least one network interface 290, the at least one processor 294, memory component 296, and/or positioning component 298 in the network entity 206 may be considered a means for receiving an association request for a PRU.

At block 1520, the location server authenticates the PRU, e.g., as discussed at stage 4 of FIG. 8 and stage 5 of FIG. 17. In an aspect, the at least one network interface 290, the at least one processor 294, memory component 296, and/or positioning component 298 in the network entity 206 may be considered a means for authenticating the PRU.

At block 1530, the location server sends an association response to the PRU, where the association response indicates an acceptance of association and conditions for performing another association with the location server if the PRU is authenticated, and where the association response indicates a rejection of the association if the PRU is not authenticated, e.g., as discussed at stages 5a and 5b of FIG. 8 and stages 6a and 6n of FIG. 17. In an aspect, the at least one network interface 290, the at least one processor 294, memory component 296, and/or positioning component 298 in the network entity 206 may be considered a means for sending an association response to the PRU, the association response indicates an acceptance of association and conditions for performing another association with the location server if the PRU is authenticated, and the association response indicates a rejection of the association if the PRU is not authenticated.

In one implementation, the association request and the association response are messages for a supplementary services protocol usable between a UE and the location server, e.g., as discussed in stages 3, 5a, and 5b of FIG. 8 and stages 3, 4, 6a, 6b of FIG. 17.

In one implementation, the association request may include an identification of the PRU (e.g. a SUPI), authentication information or both, wherein the location server authenticates the PRU by verifying the identification of the PRU or the authentication information against a known identification of a PRU or expected authentication information, respectively, e.g., as discussed at stages 2, 3, and 4 of FIG. 8. In an aspect, the at least one network interface 290, the at least one processor 294, memory component 296, and/or positioning component 298 in the network entity 206 may be considered a means for verifying the identification of the PRU or the authentication information against a known identification of a PRU or expected authentication information, respectively. For example, in one implementation, the expected authentication information may be a ciphering of at least one of the identification and a current date and time based on a private key, e.g., as discussed at stage 4 of FIG. 8.

In one implementation, the location server may authenticate the PRU by sending an authentication challenge to the PRU, receiving an authentication response from the PRU, and verifying the authentication response against an expected authentication response associated with an identification of the PRU, e.g., as discussed at stage 4 of FIG. 8. In an aspect, the at least one network interface 290, the at least one processor 294, memory component 296, and/or positioning component 298 in the network entity 206 may be considered a means for sending an authentication challenge to the PRU, a means for receiving an authentication response from the PRU, and a means for verifying the authentication response against an expected authentication response associated with an identification of the PRU. The expected authentication response associated with the identification may be a ciphering of at least one of the identification and a current date and time based on a private key, e.g., as discussed at stage 4 of FIG. 8.

In one implementation, the conditions for performing another association with the location server may comprise at least one of a periodic association timer or association based on a change of location, change of Tracking Area Identifier (TAI) or change of serving Access and mobility Management Function (AMF) for the PRU, e.g., as discussed in stage 5a of FIG. 8 and stage 6a of FIG. 17.

In one implementation, the association response may further indicate a correlation identifier to identify the location server and PRU if the PRU is authenticated, e.g., as discussed in stage 5a of FIG. 8.

In one implementation, the association response may further provide routing identifiers for one or more additional location servers with which the PRU is to perform separate association if the PRU is authenticated, e.g., as discussed in stage 5a of FIG. 8 and stage 6a of FIG. 17.

In one implementation, the association response may further provide a routing identifier for a different location server with which the PRU is to associate if the PRU is not authenticated, e.g., as discussed in stage 5b of FIG. 8 and stage 6b of FIG. 17.

In one implementation, the location server may further send an association modification to the PRU indicating at least one of: new conditions for performing association updates with the location server; routing identifiers for one or more additional location servers with which the PRU is to perform separate association; a disassociation of the PRU with the location server, e.g., as discussed in stage 1 of FIG. 9. In an aspect, the at least one network interface 290, the at least one processor 294, memory component 296, and/or positioning component 298 in the network entity 206 may be considered a means for sending an association modification to the PRU indicating at least one of new conditions for performing association updates with the location server, routing identifiers for one or more additional location servers with which the PRU is to perform separate association, a disassociation of the PRU with the location server.

In one implementation, the association request may be for an initial association with the location server or may be for an association update with the location server, e.g., as discussed in stages 2 and 3 of FIG. 8.

In one implementation, an indication is received (e.g. along with the association request) that the source of the association request is a PRU, where authenticating the PRU comprises verifying the indication that the source of the association request is a PRU has been received. The association request and the indication that the source of the association request is a PRU may be received from an Access and mobility Management Function (AMF). The indication that the source of the association request is a PRU may be based on user equipment (UE) subscription data for the PRU obtained by the AMF from a Unified Data Management (UDM). The association request and the indication that the source of the association request is a PRU may be received via a service operation based on Hypertext Transfer Protocol (HTTP).

Figure 16:
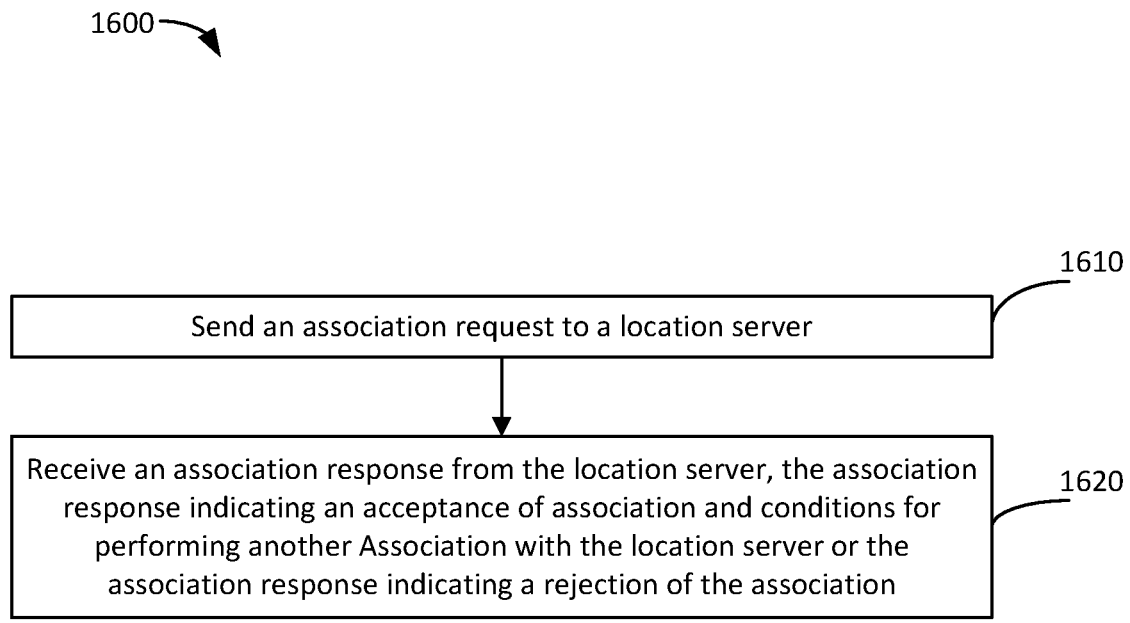
FIG. 16 illustrates a flow chart of an exemplary method for supporting positioning performed by a PRU, according to aspects of the disclosure.

FIG. 16 illustrates a flowchart of an exemplary method 1600 for supporting positioning in a wireless network performed by a PRU (e.g., PRU 105 or UE 202). The PRU, for example, may be one of a Positioning Reference Unit (PRU), reference User Equipment (UE), Roadside Unit (RSU), or Global Navigation Satellite System (GNSS) reference receiver.

At block 1610, the PRU sends an association request to a location server (e.g., LMF 172), e.g. as at stage 2 in FIG. 8 and stage 2 in FIG. 17. In an aspect, the at least one WWAN transceiver 210, the at least one processor 232, memory component 240, and/or positioning component 242 may be considered a means for sending an association request to a location server.

At block 1620, the PRU receives an association response from the location server, where the association response indicates an acceptance of association and conditions for performing another association with the location server or where the association response indicates a rejection of the association, e.g., as discussed at stages 6a and 6b of FIG. 8 and stages 7a and 7b in FIG. 17. In an aspect, the at least one WWAN transceiver 210, the at least one processor 232, memory component 240, and/or positioning component 242 may be considered a means for receiving an association response from the location server, the association response indicates an acceptance of association and conditions for performing another association with the location server or the association response indicates a rejection of the association.

In one implementation, the association request and the association response are messages for a supplementary services protocol usable between a UE or PRU and the location server, e.g., as discussed in stages 2, 5a, 6a, and 5b, 6b of FIG. 8.

In one implementation, the PRU may further send an indication of the location server with the association request, where the indication of the location server is used by an AMF (e.g., AMF 174) to determine the location server and route the association request to the location server, e.g., as discussed at stages 2 and 3 of FIG. 8. In an aspect, the at least one WWAN transceiver 210, the at least one processor 232, memory component 240, and/or positioning component 242 may be considered a means for sending an indication of the location server with the association request, the indication of the location server used by an AMF to determine the location server and route the association request to the location server. For example, the indication of the location server may be a Routing ID, wherein the Routing ID is pre-configured in the PRU or is received from a second location server during a previous Association, e.g., as discussed in stage 2 of FIG. 8.

In one implementation, the association request may include an identification of the PRU (e.g. a SUPI), authentication information or both for authentication by the location server, e.g., as discussed in stage 4 of FIG. 8. For example, the authentication information may be a ciphering of at least one of the identification and a current date and time based on a private key, e.g., as discussed in stage 4 of FIG. 8.

In one implementation, the PRU may further receive an authentication challenge from the location server and send an authentication response to the location server, e.g., as discussed in stage 4 of FIG. 8. In an aspect, the at least one WWAN transceiver 210, the at least one processor 232, memory component 240, and/or positioning component 242 may be considered a means for receiving an authentication challenge from the location server and a means for sending an authentication response to the location server. For example, the authentication response may include a ciphering of at least one of an identification of the PRU and a current date and time based on a private key, e.g., as discussed in stage 4 of FIG. 8.

In one implementation, the conditions for performing another association with the location server may comprise at least one of a periodic association timer or association based on a change of location, change of Tracking Area Identifier (TAI) or change of serving Access and mobility Management Function (AMF) for the PRU, e.g., as discussed in stages 5a and 6a of FIG. 8.

In one implementation, the association response may further indicate a routing identifier for the location server, and the PRU may further update an association with the location server using the routing identifier, e.g., as discussed in stages 2, 5a, and 6a of FIG. 8. In an aspect, the at least one WWAN transceiver 210, the at least one processor 232, memory component 240, and/or positioning component 242 may be considered a means for updating association with the location server using the routing identifier.

In one implementation, the association response may further provide routing identifiers for one or more additional location servers, and the PRU may further associate with each of the one or more additional location servers using the routing identifiers, e.g., as discussed in stages 2, 5a, and 6a of FIG. 8. In an aspect, the at least one WWAN transceiver 210, the at least one processor 232, memory component 240, and/or positioning component 242 may be considered a means for associating with each of the one or more additional location servers using the routing identifiers.

In one implementation, the association response may indicate the rejection of the association and may further provide a routing identifier for a different location server, and the PRU may further associate with the different location server using the routing identifier, e.g., as discussed in stages 2, 5b, and 6b of FIG. 8. In an aspect, the at least one WWAN transceiver 210, the at least one processor 232, memory component 240, and/or positioning component 242 may be considered a means for associating with the different location server using the routing identifier.

In one implementation, the association request may be for an initial association with the location server or may be for an association update with the location server and the association request may include a routing identifier for the location server received in a previous association with the location server, e.g., as discussed in stage 2 of FIG. 8.

In one implementation, the PRU may further receive an association modification from the location server indicating at least one of new conditions for performing association updates with the location server, routing identifiers for one or more additional location servers with which the PRU is to perform separate association, a disassociation of the PRU with the location server, e.g., as discussed at stage 3 of FIG. 9. In an aspect, the at least one WWAN transceiver 210, the at least one processor 232, memory component 240, and/or positioning component 242 may be considered a means for receiving an association modification from the location server indicating at least one of new conditions for performing association updates with the location server, routing identifiers for one or more additional location servers with which the PRU is to perform separate association, a disassociation of the PRU with the location server.

In one implementation, sending the association request to the location server comprises sending the association request to the location server via an AMF, where the AMF forwards the association request to the location server with an indication that the source of the association request is a PRU. The AMF may provide the indication that the source of the association request is a PRU based on user equipment (UE) subscription data for the PRU obtained by the AMF from a Unified Data Management (UDM). The AMF may send the association request and the indication that the source of the association request is a PRU to the location server via a service operation based on a Hypertext Transfer Protocol (HTTP). The AMF may not decode or interpret the association request but may provide an indication that a source of any supplementary services or location supplementary services message sent to the location server is or is not a PRU for any UE or PRU that sends the supplementary services message or the location to the location server via the AMF.

FIG. 17 shows a procedure 1700 that may be used by a PRU 1710 (e.g. which may be an example of a PRU 105) to associate with a serving LMF 172. The procedure 1700 may be used for initial association with the serving LMF 172 which may occur when the PRU 1710 first starts to access the HPLMN for the PRU 1710 or when the PRU 1710 accesses the HPLMN for the PRU 1710 at a later time. The procedure 1700 can also be used to perform an association update to inform the serving LMF 172 of the continued availability of the PRU 1710 or to inform the serving LMF 172 of some change to the PRU 1710 such as a change of location (e.g. a change of tracking area or change of serving AMF) or a change of the PRU 1710 positioning capabilities. The PRU Association procedure 1700 may be restricted to the Home PLMN (HPLMN) of the PRU 1710 and may not be performed when accessing any other PLMN.

As a precondition, for initial Association, a Routing Identifier may be previously configured in the PRU 1710 to indicate the serving LMF 172. For subsequent Association, a Routing ID indicating a serving LMF 172 may have been previously returned to the PRU 1710 at stage 7a or 7b of a previous Association procedure.

It can be noted that a Correlation ID and a Routing ID can be different terms for the same identifier. The term "Correlation ID" may be used for an identifier in NL1 service operations between an AMF 174 and LMF 172 while the term "Routing ID" may be used for an identifier in a NAS message sent over an N1 reference point between a PRU 1710 and AMF 174.

As illustrated by the numbered stages in FIG. 17, the PRU Association procedure 1700 may proceed as follows:

At stage 1, the PRU 1710 may perform a UE Triggered Service Request if in a CM IDLE state.

At stage 2, the PRU 1710 may send a supplementary services PRU Association Request to the serving AMF 174 in an UL NAS TRANSPORT message and may include the preconfigured Routing ID for an initial Registration or the Routing ID received at stage 7a or stage 7b for a previous Association procedure. The PRU Association Request may be included in the UL NAS TRANSPORT message as a "Location services message container" at the NAS level. The PRU Association Request may include a reason for the Association (e.g. initial Association, Association update, periodic Association), the PRU's positioning capabilities, location information (if known), a type and state of the PRU (e.g. mobile/static type) and may include an identity for the PRU 1710 (e.g. a SUPI or a PEI).

At stage 3, the AMF 174 may verify that the sender of the PRU Association Request is a PRU using subscription information from the UDM for the PRU 1710 (e.g. the UDM 171). If stage 3 is not performed, the AMF 174 may treat the PRU 1710 as a normal UE 104. In one embodiment, the AMF 174 may not decode or interpret the PRU Association Request but may determine whether the source of the supplementary services message received at stage 2 is or is not a PRU (based on subscription information from the UDM for the UE or PRU) for any UE or PRU that sends a supplementary services message or a location supplementary services message to LMF 172 via AMF 174.

At stage 4, AMF 174 may select the serving LMF 172 based on the Routing ID and optionally the current TAI and may transfer the PRU Association Request to the serving LMF 172 using an Namf_Communication_N1MessageNotify service operation (which may be based on HTTP). If stage 3 was performed, the AMF 174 may include in the service operation an indication that the PRU 1710 was verified by the AMF 174. The AMF 174 may also include the SUPI of the PRU 1710.

At stage 5, the serving LMF 174 may authenticate the PRU 1710. This can be based on an indication that the PRU 1710 was verified by the AMF 174 if included at stage 4 or may be based on matching the SUPI for the PRU 1710 received at stage 4 with a corresponding SUPI configured in the LMF 172.

At stage 6a, if the serving LMF 172 can authenticate the PRU 1710 at stage 5 and can accept the association, the serving LMF 172 may return a PRU Association Accept to the serving AMF 174, as a location services supplementary services message, and a Correlation ID. The Correlation ID may be assigned by the serving LMF 172 to identify the serving LMF 172 and optionally the PRU 1710. The PRU Association Accept may indicate conditions for performing PRU Association updates with the serving LMF 172 at a later time which may include a periodic PRU Association update timer and/or PRU Association update based on a change of PRU location, change of PRU TAI or change of serving AMF. Optionally, the PRU Association Accept may include Routing IDs for additional serving LMFs.

At stage 7a, the serving AMF 174 may forward the PRU Association Accept and a Routing ID equal to the Correlation ID to the PRU 1710. The PRU 1710 may store the Routing ID which may be used for any further PRU Association update with the serving LMF 172.

At stage 6b, if the serving LMF 172 is unable to authenticate the PRU 1710 at stage 5 or cannot accept the PRU Association for some other reason (e.g. the serving LMF 172 is not the correct serving LMF for the PRU 1710), the serving LMF 172 may send a PRU Association Reject to the serving AMF 174 and may include the Routing ID of a new serving LMF.

At stage 7b, the serving AMF 174 may forward the PRU Association Reject to the PRU 1710.

At stage 8, if PRU Association is performed successfully as in stages 6*a* and 7*a*, the serving LMF 172 may optionally verify any PRU location provided at stage 4 or obtain a more accurate location of the PRU 1710 using the procedures defined in FIG. 10 or 3GPP TS 23.273 clause 6.11. The LMF 172 may also store information received for the PRU 1710.

At stage 9, if PRU Association is performed successfully as in stages 6*a* and 7*a* and if this is an initial PRU Association or if this is a PRU Association update and the location of the PRU 1710 has changed, the serving LMF 172 may optionally instigate an Nnrf_NFManagement_NFUpdate Request service operation towards an NRF 177 and may include an indication of a PRU, a PRU identifier (which may be defined by the LMF 172 locally or may be global such as being a SUPI or PEI of the PRU 1710) and the location of the PRU 1710. If the PRU identifier already exists in the NRF 177 for the serving LMF 172 (from a previous Association), the NRF 177 may overwrite the old PRU location with the new PRU location. Otherwise, the NRF 177 may add the PRU information to the information stored in the NRF 177 for the serving LMF 172.

At stage 10, the NRF 177 may return a confirmation response to the serving LMF 172.

At stage 11, if the PRU 1710 receives Routing IDs for additional serving LMFs at stage 7*a*, the PRU 1710 may perform an initial PRU Association procedure with each of the additional serving LMFs. If the PRU 1710 receives a Routing ID of a new serving LMF at stage 7*b*, the PRU performs an initial PRU Association procedure with the new serving LMF.

With respect to the procedure 1700, it can be noted that the PRU 1710 may be configured with a limit on the number and/or duration of unsuccessful PRU Association attempts. When this limit is reached or if a PRU Association is rejected at stage 7*b* without a new serving LMF being indicated, the PRU 1710 may send an indication to a controlling network function (NF) or application function (AF). The controlling NF or AF could then reconfigure the PRU 1710 with a different serving LMF or could indicate that the PRU 1710 is temporarily deactivated.

Further, a PRU 1710 may be configured to limit association with additional serving LMFs. This may be implementation dependent.

Figure 18:
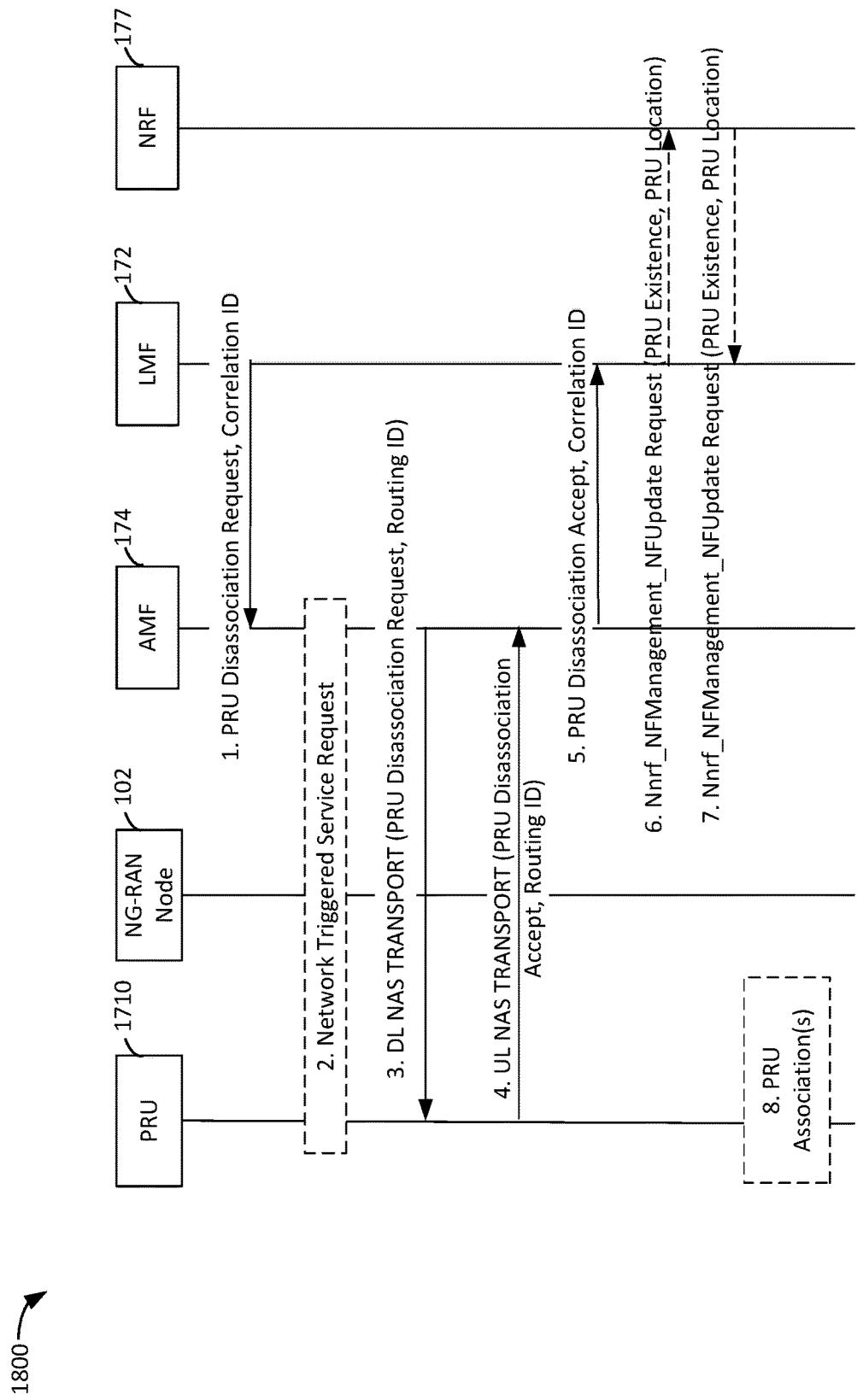
FIG. 18 illustrates an example PRU disassociation procedure, according to aspects of the disclosure.

FIG. 18 shows a procedure 1800 that may be used by a serving LMF 172 to disassociate an already associated PRU 1710. The procedure 1800 may be used prior to the serving LMF 172 becoming unavailable (e.g. for maintenance, removal or replacement) or to transfer the PRU 1710 to a different serving LMF for other reasons.

As a precondition for the procedure 1800, the PRU 1710 may have been previously associated with the serving LMF 172 using the procedure 1700 of FIG. 17, as previously described.

As illustrated by the numbered stages in FIG. 18, the PRU disassociation procedure 1800 may proceed follows:

At stage 1, the serving LMF 172 for the PRU 1710 may send a PRU Disassociation Request to the serving AMF 174 as a location services supplementary services message and may include the SUPI of the PRU 1710 and a Correlation ID identifying the LMF 172. The PRU Disassociation Request may include a Routing ID for a new serving LMF and a time window (e.g. a start time and either an end time or a duration) when the PRU 1710 is allowed to associate with the new serving LMF. In some instances, the LMF 172 may send a PRU Disassociation Accept in response to receiving a PRU Disassociation Request (not shown) from the PRU 1710. Thus, the PRU Disassociation Request may originate from the LMF 172 or PRU 1710, depending on different circumstances.

At stage 2, if the PRU 1710 is in a CM IDLE state, the serving AMF 174 may perform a Network Triggered service request to place the PRU 1710 in a CM CONNECTED state.

At stage 3, the serving AMF 174 may forward the PRU Disassociation Request and a Routing ID equal to the Correlation ID to the PRU 1710.

At stage 4, the PRU 1710 may return a supplementary services PRU Disassociation Accept to the serving AMF 174 in an UL NAS TRANSPORT message and may include the Routing ID received in stage 3.

At stage 5, the serving AMF 174 may forward the PRU Disassociation Accept to the serving LMF 172 indicated by the Routing ID received at stage 4 and may include a Correlation ID equal to the Routing ID.

At stage 6, if the serving LMF 172 has indicated the PRU 1710 to an NRF 177 during PRU Association (e.g. as at stages 9 and 10 for the procedure 1700), the serving LMF 172 may instigate an Nnrf_NFManagement_NFUpdate Request service operation towards the NRF 177 and may include an indication of PRU removal and the PRU identifier (e.g. the PRU identifier sent at stage 9 for the procedure 1700). The NRF 177 then may remove the information in the NRF 177 for this PRU 1710 for the serving LMF 172.

At stage 7, the NRF 177 may return a confirmation response to the serving LMF 172.

At stage 8, if the PRU 1710 received a Routing ID for a new serving LMF at stage 3, the PRU 1710 may perform an initial PRU Association with the new serving LMF as described previously with regard to the procedure 1700 of FIG. 17. If a time window was received at stage 3, the PRU Association with the new serving LMF may be performed during the time window.

With respect to the procedure 1800, it can be noted that if a new serving LMF is not indicated at stage 3 or if the PRU 1710 is unable to successfully associate with the new serving LMF at stage 8 during the time window, the PRU 1710 may send an indication to a controlling NF or AF. The controlling NF or AF could then reconfigure the PRU 1710 with a different serving LMF or could indicate that the PRU 1710 is temporarily deactivated.

Figure 19:
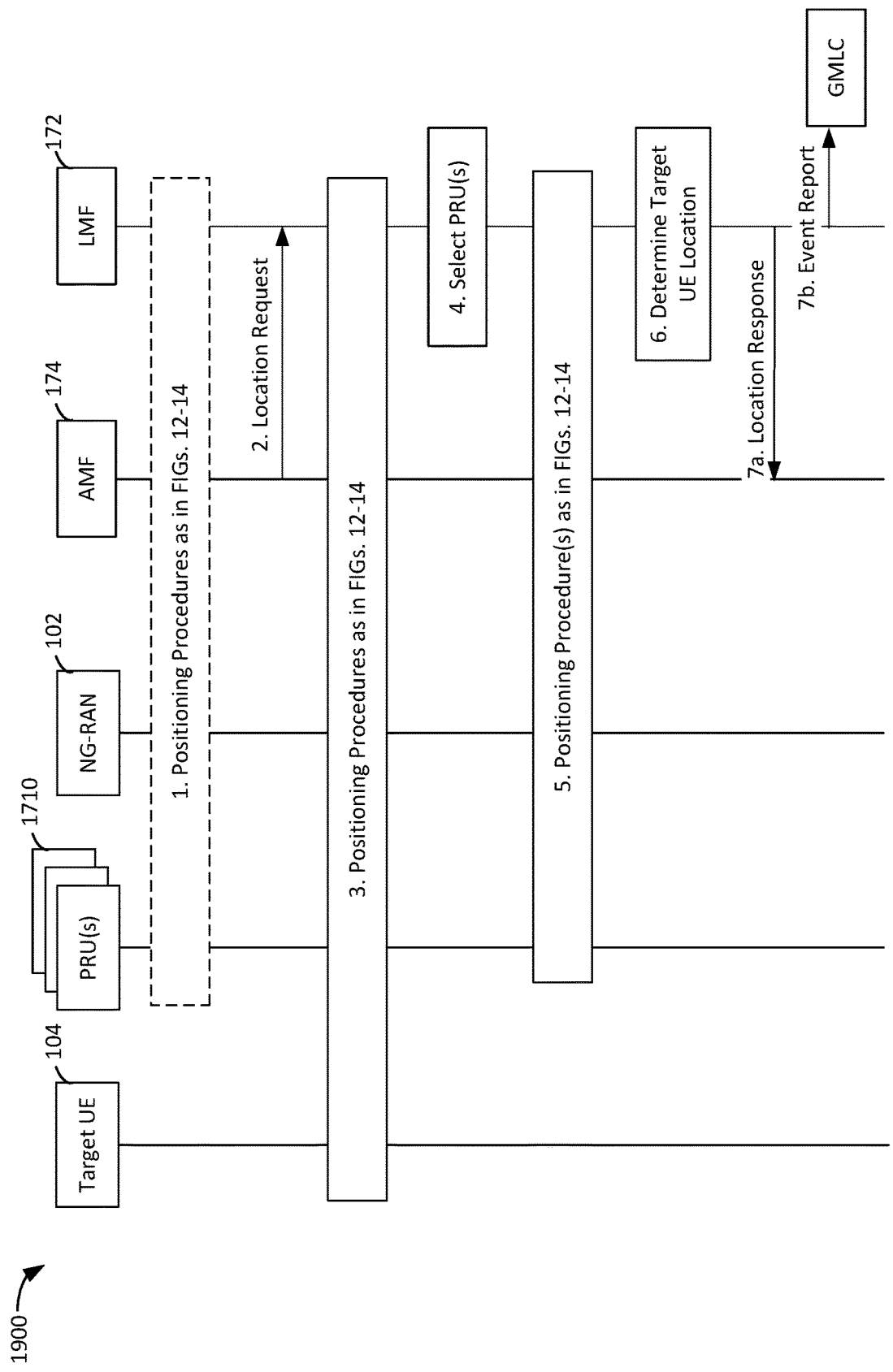
FIG. 19 illustrates an example procedure that may be used to obtain a location of a target UE using information from one or more PRUs, according to aspects of the disclosure.

FIG. 19 shows a procedure 1900 used by a serving LMF 172 for a target UE 104 to obtain a location of the target UE 104 using location information provided by one or more PRUs 1710 associated in the serving LMF 172.

As indicated at stage 1, the serving LMF 172 may use the procedures defined in FIGS. 12-14 (or the procedures defined in 3GPP TS 23.273 clause 6.11) to obtain location information from one or more PRUs 1710 associated in the serving LMF 172 that is not related to the target UE 104. For example, the location information may include location information for the PRU(s) 1710 or for NG-RAN nodes 102 (e.g. gNBs 102) or both.

At stage 2, the serving LMF 172 may receive a location request from the serving AMF 174 for the target UE 104. The location request may be included in an Nlmf_Location_DetermineLocation Request service operation for a 5GC Mobile Originated Location Request (5GC-MO-LR), 5GC Mobile Terminated Location Request (5GC-MT-LR) or a 5GC Network Induced Location Request (5GC-NI-LR) for the target UE 104. Alternatively, the location request may be implied by receipt of an Namf_Communication_N1MessageNotify service operation carrying a supplementary services event report from the target UE 104 for a periodic or triggered 5GC-MT-LR.

At stage 3, the serving LMF 172 may use the procedures defined in FIGS. 12-14 (or the procedures defined in 3GPP TS 23.273 clause 6.11) to obtain location information for the target UE 104 from the target UE 104 and/or from NG-RAN nodes (e.g. gNBs) 102.

At stage 4, the serving LMF 172 may select one or more PRUs 1710 associated with the serving LMF 172 to assist in locating the target UE 104. The selected PRU(s) 1710 may be nearby to an initial location estimate for the target UE 104 obtained at stage 3 or indicated by a serving cell identifier for the target UE 104 received at stage 2.

At stage 5, the serving LMF 172 uses the procedure defined in FIGS. 12-14 (or the procedures defined in 3GPP TS 23.273 clause 6.11.1) to obtain location information related to the target UE 104 from the PRU(s) 1710 selected at stage 4.

At stage 6, the serving LMF 172 may determine the location of the target UE 104 based on the location information obtained at stage 1 (if stage 1 is performed), stage 3 and/or stage 5.

At stage 7a, if an Nlmf_Location_DetermineLocation Request service operation for a 5GC-MO-LR, 5GC-MT-LR or 5GC-NI-LR was received at stage 2, the serving LMF 172 may return the location estimate of the target UE 104 to the serving AMF 174.

At stage 7b, if an Namf_Communication_N1MessageNotify service operation carrying a supplementary services event report from the target UE 104 for a periodic or triggered 5GC-MT-LR was received at stage 2, the serving LMF 172 may send an event report for the target UE 104 to a GMLC (e.g. GMLC 175) with the location estimate obtained at stage 6 (e.g. as described in 3GPP TS 23.273 clause 6.3.1).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method performed by a location server for supporting positioning in a wireless network, comprising: receiving an association request for a positioning reference unit (PRU); authenticating the PRU; and sending an association response to the PRU, the association response indicating an acceptance of association and conditions for performing another association with the location server if the PRU is authenticated, and the association response indicating a rejection of the association if the PRU is not authenticated.

Clause 2. The method of clause 1, wherein the association request and the association response are messages for a supplementary services protocol usable between a UE and the location server.

Clause 3. The method of any of clauses 1-2, wherein the association request includes an identification of the PRU, authentication information or both, wherein authenticating the PRU comprises verifying the identification of the PRU or the authentication information against a known identification of a PRU or expected authentication information, respectively.

Clause 4. The method of clause 3, wherein the expected authentication information comprises a ciphering of at least one of the identification and a current date and time based on a private key.

Clause 5. The method of any of clauses 1-3, wherein authenticating the PRU comprises: sending an authentication challenge to the PRU; receiving an authentication response from the PRU; and verifying the authentication response against an expected authentication response associated with an identification of the PRU.

Clause 6. The method of clause 5, wherein the expected authentication response associated with the identification comprises a ciphering of at least one of the identification and a current date and time based on a private key.

Clause 7. The method of any of clauses 1-6, wherein the conditions for performing another association with the location server comprise at least one of a periodic association timer or association based on a change of location, change of Tracking Area Identifier (TAI) or change of serving Access and mobility Management Function (AMF) for the PRU.

Clause 8. The method of any of clauses 1-7, wherein the association response further indicates a correlation identifier to identify the location server and PRU if the PRU is authenticated.

Clause 9. The method of any of clauses 1-8, wherein the association response further provides routing identifiers for one or more additional location servers with which the PRU is to perform separate association if the PRU is authenticated.

Clause 10. The method of any of clauses 1-9, wherein the association response further provides a routing identifier for a different location server with which the PRU is to associate if the PRU is not authenticated.

Clause 11. The method of any of clauses 1-10, further comprising: sending a disassociation request to the PRU indicating at least one of new conditions for performing association updates with the location server, routing identifiers for one or more additional location servers with which the PRU is to perform separate association, a disassociation of the PRU with the location server.

Clause 12. The method of any of clauses 1-11, wherein the association request is for an initial association with the location server or is for an association update with the location server.

Clause 13. The method of any of clauses 1-12, wherein the PRU comprises one of a Positioning Reference Unit (PRU), reference User Equipment (UE), Roadside Unit (RSU), or Global Navigation Satellite System (GNSS) reference receiver.

Clause 14. The method of any of clause 1-2 and 7-13, further comprising receiving indication that the source of the association request is a PRU, wherein authenticating the PRU comprises verifying the indication that the source of the association request is a PRU has been received.

Clause 15. The method of clause 14, wherein the association request and the indication that the source of the association request is a PRU are received from an Access and mobility Management Function (AMF).

Clause 16. The method of clause 15, wherein the indication that the source of the association request is a PRU is based on user equipment (UE) subscription data obtained by the AMF from Unified Data Management (UDM).

Clause 17. The method of any of clauses 14-16, wherein the association request and the indication that the source of the association request is a PRU are received via a service operation based on Hypertext Transfer Protocol (HTTP).

Clause 18. A location server configured for supporting positioning in a wireless network, comprising: an external interface configured to wirelessly communicate with entities in a wireless network; at least one memory; at least one processor coupled to the external interface and the at least one memory, wherein the at least one processor is configured to: receive, via the external interface, an association request for a positioning reference unit (PRU); authenticate the PRU; and send, via the external interface, an association response to the PRU, the association response indicating an acceptance of association and conditions for performing another association with the location server if the PRU is authenticated, and the association response indicating a rejection of the association if the PRU is not authenticated.

Clause 19. The location server of clause 18, wherein the association request and the association response are messages for a supplementary services protocol usable between a UE and the location server.

Clause 20. The location server of any of clauses 18-19, wherein the association request includes an identification of the PRU, authentication information or both, wherein the at least one processor is configured to authenticate the PRU by being configured to verify the identification of the PRU or the authentication information against a known identification of a PRU or expected authentication information, respectively.

Clause 21. The location server of clause 20, wherein the expected authentication information comprises a ciphering of at least one of the identification and a current date and time based on a private key.

Clause 22. The location server of any of clauses 18-21, wherein the at least one processor is configured to authenticate the PRU by being configured to: send an authentication challenge to the PRU; receive an authentication response from the PRU; and verify the authentication response against an expected authentication response associated with an identification of the PRU.

Clause 23. The location server of clause 22, wherein the expected authentication response associated with the identification comprises a ciphering of at least one of the identification and a current date and time based on a private key.

Clause 24. The location server of any of clauses 18-23, wherein the conditions for performing another association with the location server comprise at least one of a periodic association timer or association based on a change of location, change of Tracking Area Identifier (TAI) or change of serving Access and mobility Management Function (AMF) for the PRU.

Clause 25. The location server of any of clauses 18-24, wherein the association response further indicates a correlation identifier to identify the location server and PRU if the PRU is authenticated.

Clause 26. The location server of any of clauses 18-25, wherein the association response further provides routing identifiers for one or more additional location servers with which the PRU is to perform separate association if the PRU is authenticated.

Clause 27. The location server of any of clauses 18-26, wherein the association response further provides a routing identifier for a different location server with which the PRU is to associate if the PRU is not authenticated.

Clause 28. The location server of any of clauses 18-27, wherein the at least one processor is further configured to: send a disassociation request to the PRU indicating at least one of new conditions for performing association updates with the location server, routing identifiers for one or more additional location servers with which the PRU is to perform separate association, a disassociation of the PRU with the location server.

Clause 29. The location server of any of clauses 18-28, wherein the association request is for an initial association with the location server or is for an association update with the location server.

Clause 30. The location server of any of clauses 18-29, wherein the PRU comprises one of a Positioning Reference Unit (PRU), reference User Equipment (UE), Roadside Unit (RSU), or Global Navigation Satellite System (GNSS) reference receiver.

Clause 31. The location server of any of clauses 18-19 and 24-30, wherein the at least one processor is further configured to receive indication that the source of the association request is a PRU, and wherein the at least one processor is configured to authenticate the PRU by verifying the indication that the source of the association request is a PRU has been received.

Clause 32. The method of clause 31, wherein the at least one processor is further configured to receive the association request and the indication that the source of the association request is a PRU from an Access and mobility Management Function (AMF).

Clause 33. The method of clause 32, wherein the indication that the source of the association request is a PRU is based on user equipment (UE) subscription data obtained by the AMF from Unified Data Management (UDM).

Clause 34. The method of any of clauses 31-33, wherein the at least one processor is further configured to receive the association request and the indication that the source of the association request is a PRU via a service operation based on Hypertext Transfer Protocol (HTTP).

Clause 35. A location server configured for supporting positioning in a wireless network, comprising: means for receiving an association request for a positioning reference unit (PRU); means for authenticating the PRU; and means for sending an association response to the PRU, the association response indicating an acceptance of association and conditions for performing another association with the location server if the PRU is authenticated, and the association response indicating a rejection of the association if the PRU is not authenticated.

Clause 36. A non-transitory storage medium including program code stored thereon, the program code is operable to configure at least one processor in a location server for supporting positioning in a wireless network, the program code comprising instructions to: receive an association request for a positioning reference unit (PRU); authenticate the PRU; and send an association response to the PRU, the association response indicating an acceptance of association and conditions for performing another association with the location server if the PRU is authenticated, and the association response indicating a rejection of the association if the PRU is not authenticated.

Clause 37. A method performed by a positioning reference unit (PRU) for supporting positioning in a wireless network, comprising: sending an association request to a location server; receiving an association response from the location server, the association response indicating an acceptance of association and conditions for performing another association with the location server or the association response indicating a rejection of the association.

Clause 38. The method of clause 37, wherein the association request and the association response are messages for a supplementary services protocol usable between a UE and the location server.

Clause 39. The method of any of clauses 37-38, further comprising sending an indication of the location server with the association request, the indication of the location server used by an AMF to determine the location server and route the association request to the location server.

Clause 40. The method of clause 39, wherein the indication of the location server comprises a Routing ID, wherein the Routing ID is pre-configured in the PRU or is received from a second location server during a previous Association.

Clause 41. The method of any of clauses 37-40, wherein the association request includes an identification of the PRU, authentication information or both for authentication by the location server.

Clause 42. The method of clause 41, wherein the authentication information comprises a ciphering of at least one of the identification and a current date and time based on a private key.

Clause 43. The method of any of clauses 37-42, further comprising: receiving an authentication challenge from the location server; sending an authentication response to the location server.

Clause 44. The method of clause 43, wherein the authentication response comprises a ciphering of at least one of an identification of the PRU and a current date and time based on a private key.

Clause 45. The method of any of clauses 37-44, wherein the conditions for performing another association with the location server comprise at least one of a periodic association timer or association based on a change of location, change of Tracking Area Identifier (TAI) or change of serving Access and mobility Management Function (AMF) for the PRU.

Clause 46. The method of any of clauses 37-45, wherein the association response further indicates a routing identifier for the location server, the method further comprising updating association with the location server using the routing identifier.

Clause 47. The method of any of clauses 37-46, wherein the association response further provides routing identifiers for one or more additional location servers, the method further comprising associating with each of the one or more additional location servers using the routing identifiers.

Clause 48. The method of any of clauses 37-47, wherein the association response indicates the rejection of the association and further provides a routing identifier for a different location server, the method further comprising associating with the different location server using the routing identifier.

Clause 49. The method of any of clauses 37-48, wherein the association request is for an initial association with the location server or is for an association update with the location server and the association request includes a routing identifier for the location server received in a previous association with the location server.

Clause 50. The method of any of clauses 37-49, further comprising: receiving a disassociation request from the location server indicating at least one of new conditions for performing association updates with the location server, routing identifiers for one or more additional location servers with which the PRU is to perform separate association, a disassociation of the PRU with the location server.

Clause 51. The method of any of clauses 37-50, wherein the PRU comprises one of a Positioning Reference Unit (PRU), reference User Equipment (UE), Roadside Unit (RSU), or Global Navigation Satellite System (GNSS) reference receiver.

Clause 52. The method of any of clauses 37-42 and 45-51, wherein sending the association request to the location server comprises sending the association request to the location server via an AMF, and wherein the AMF forwards the association request to the location server with an indication that the source of the association request is a PRU.

Clause 53. The method of clause 52, the AMF provides the indication that the source of the association request is a PRU based on user equipment (UE) subscription data obtained by the AMF from Unified Data Management (UDM).

Clause 54. The method of any of clauses 52-53, wherein the AMF sends the association request and the indication that the source of the association request is a PRU to the location server via a service operation based on Hypertext Transfer Protocol (HTTP).

Clause 55. A positioning reference unit (PRU) configured for supporting positioning in a wireless network, comprising: a wireless transceiver configured to wirelessly communicate with entities in a wireless network; at least one memory; at least one processor coupled to the wireless transceiver and the at least one memory, wherein the at least one processor is configured to: send, via the wireless transceiver, an association request to a location server; receive, via the wireless transceiver, an association response from the location server, the association response indicating an acceptance of association and conditions for performing another association with the location server or the association response indicating a rejection of the association.

Clause 56. The PRU of clause 55, wherein the association request and the association response are messages for a supplementary services protocol usable between a UE and the location server.

Clause 57. The PRU of any of clauses 55-56, wherein the at least one processor is further configured to send an indication of the location server with the association request, the indication of the location server used by an AMF to determine the location server and route the association request to the location server.

Clause 58. The PRU of clause 57, wherein the indication of the location server comprises a Routing ID, wherein the Routing ID is pre-configured in the PRU or is received from a second location server during a previous Association.

Clause 59. The PRU of any of clauses 55-58, wherein the association request includes an identification of the PRU, authentication information or both for authentication by the location server.

Clause 60. The PRU of clause 59, wherein the authentication information comprises a ciphering of at least one of the identification and a current date and time based on a private key.

Clause 61. The PRU of any of clauses 55-60, wherein the at least one processor is further configured to: receive, via the wireless transceiver, an authentication challenge from the location server; send, via the wireless transceiver, an authentication response to the location server.

Clause 62. The PRU of clause 61, wherein the authentication response comprises a ciphering of at least one of an identification of the PRU and a current date and time based on a private key.

Clause 63. The PRU of any of clauses 55-62, wherein the conditions for performing another association with the location server comprise at least one of a periodic association timer or association based on a change of location, change of Tracking Area Identifier (TAI) or change of serving Access and mobility Management Function (AMF) for the PRU.

Clause 64. The PRU of any of clauses 55-63, wherein the association response further indicates a routing identifier for the location server, wherein the at least one processor is further configured to update association with the location server using the routing identifier.

Clause 65. The PRU of any of clauses 55-64, wherein the association response further provides routing identifiers for one or more additional location servers, wherein the at least one processor is further configured to associate with each of the one or more additional location servers using the routing identifiers.

Clause 66. The PRU of any of clauses 55-65, wherein the association response indicates the rejection of the association and further provides a routing identifier for a different location server, wherein the at least one processor is further configured to associate with the different location server using the routing identifier.

Clause 67. The PRU of any of clauses 55-66, wherein the association request is for an initial association with the location server or is for an association update with the location server and the association request includes a routing identifier for the location server received in a previous association with the location server.

Clause 68. The PRU of any of clauses 55-67, wherein the at least one processor is further configured to: receive a disassociation request from the location server indicating at least one of new conditions for performing association updates with the location server, routing identifiers for one or more additional location servers with which the PRU is to perform separate association, a disassociation of the PRU with the location server.

Clause 69. The PRU of any of clauses 55-68, wherein the PRU comprises one of a Positioning Reference Unit (PRU), reference User Equipment (UE), Roadside Unit (RSU), or Global Navigation Satellite System (GNSS) reference receiver.

Clause 70. A positioning reference unit (PRU) configured for supporting positioning in a wireless network, comprising: means for sending an association request to a location server; means for receiving an association response from the location server, the association response indicating an acceptance of association and conditions for performing another association with the location server or the association response indicating a rejection of the association.

Clause 71. A non-transitory storage medium including program code stored thereon, the program code is operable to configure at least one processor in a positioning reference unit (PRU) for supporting positioning in a wireless network, the program code comprising instructions to: send an association request to a location server; receive an association response from the location server, the association response indicating an acceptance of association and conditions for performing another association with the location server or the association response indicating a rejection of the association.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a location server for supporting positioning in a wireless network, the method comprising:
  receiving an association request for a positioning reference unit (PRU);
  authenticating the PRU; and
  sending an association response to the PRU, the association response indicating an acceptance of association and conditions for performing another association with the location server if the PRU is authenticated, and the association response indicating a rejection of the association if the PRU is not authenticated, wherein the association response further:
  indicates a correlation identifier to identify the location server and PRU if the PRU is authenticated,
  provides routing identifiers for one or more additional location servers with which the PRU is to perform separate association if the PRU is authenticated,
  provides a routing identifier for a different location server with which the PRU is to associate if the PRU is not authenticated, or
  some combination thereof.

2. The method of claim 1, wherein the association request and the association response are messages for a supplementary services protocol usable between a UE and the location server.

3. The method of claim 1, wherein the association request includes an identification of the PRU, authentication information, or both, wherein authenticating the PRU comprises verifying the identification of the PRU or the authentication information against a known identification of a PRU or expected authentication information, respectively.

4. The method of claim 1, wherein authenticating the PRU comprises:
  sending an authentication challenge to the PRU;
  receiving an authentication response from the PRU; and
  verifying the authentication response against an expected authentication response associated with an identification of the PRU.

5. The method of claim 1, wherein the conditions for performing another association with the location server comprise at least one of a periodic association timer or association based on a change of location, change of Tracking Area Identifier (TAI) or change of serving Access and mobility Management Function (AMF) for the PRU.

6. The method of claim 1, further comprising sending a disassociation request to the PRU indicating:
  new conditions for performing association updates with the location server,
  routing identifiers for one or more additional location servers with which the PRU is to perform separate association,
  a disassociation of the PRU with the location server, or
  some combination thereof.

7. The method of claim 1, further comprising receiving a disassociation request from the PRU, the disassociation request requesting a disassociation of the PRU with the location server.

8. The method of claim 1, wherein the association request is for an initial association with the location server or is for an association update with the location server.

9. The method of claim 1, wherein the PRU comprises one of a reference location device (RLD), reference User Equipment (UE), Roadside Unit (RSU), or Global Navigation Satellite System (GNSS) reference receiver.

10. The method of claim 1, further comprising receiving an indication that the source of the association request is a PRU, wherein authenticating the PRU comprises verifying the indication that the source of the association request is a PRU has been received.

11. A location server for supporting positioning in a wireless network, the location server comprising:
one or more transceivers;
one or more memories; and
one or more processors communicatively coupled with the one or more transceivers and the one or more memories, wherein the one or more processors are configured to:
receive an association request for a positioning reference unit (PRU);
authenticate the PRU; and
send an association response to the PRU, the association response indicating an acceptance of association and conditions for performing another association with the location server if the PRU is authenticated, and the association response indicating a rejection of the association if the PRU is not authenticated, wherein the one or more processors are configured to cause the association response to further:
indicate a correlation identifier to identify the location server and PRU if the PRU is authenticated,
provide routing identifiers for one or more additional location servers with which the PRU is to perform separate association if the PRU is authenticated,
provide a routing identifier for a different location server with which the PRU is to associate if the PRU is not authenticated, or
some combination thereof.

12. The location server of claim 11, wherein, to authenticate the PRU, the one or more processors are configured to:
send an authentication challenge to the PRU;
receive an authentication response from the PRU; and
verify the authentication response against an expected authentication response associated with an identification of the PRU.

13. The location server of claim 11, wherein the one or more processors are further configured to send a disassociation request to the PRU indicating:
conditions for performing association updates with the location server,
routing identifiers for one or more additional location servers with which the PRU is to perform separate association,
a disassociation of the PRU with the location server, or some combination thereof.

14. The location server of claim 11, wherein the one or more processors are further configured to receive a disassociation request from the PRU, the disassociation request requesting a disassociation of the PRU with the location server.

15. A method performed by a positioning reference unit (PRU) for supporting positioning in a wireless network, the method comprising:
sending an association request to a location server; and
receiving an association response from the location server, the association response indicating an acceptance of association and conditions for performing another association with the location server or the association response indicating a rejection of the association, wherein the association response further:
indicates a correlation identifier to identify the location server and PRU if the PRU is authenticated,
provides routing identifiers for one or more additional location servers with which the PRU is to perform separate association if the PRU is authenticated,
provides a routing identifier for a different location server with which the PRU is to associate if the PRU is not authenticated, or
some combination thereof.

16. The method of claim 15, wherein the association request and the association response are messages for a supplementary services protocol usable between a UE and the location server.

17. The method of claim 15, further comprising sending an indication of the location server with the association request, the indication of the location server used by an AMF to determine the location server and route the association request to the location server.

18. The method of claim 15, wherein the association request includes an identification of the PRU, authentication information, or both, for authentication by the location server.

19. The method of claim 15, further comprising:
receiving an authentication challenge from the location server; and
sending an authentication response to the location server.

20. The method of claim 15, wherein the conditions for performing another association with the location server comprise at least one of a periodic association timer or association based on a change of location, change of Tracking Area Identifier (TAI) or change of serving Access and mobility Management Function (AMF) for the PRU.

21. The method of claim 15, wherein the association response further:
indicates a routing identifier for the location server, the method further comprising updating association with the location server using the routing identifier,
provides routing identifiers for one or more additional location servers, the method further comprising associating with each of the one or more additional location servers using the routing identifiers, or
indicates the rejection of the association and further provides a routing identifier for a different location server, the method further comprising associating with the different location server using the routing identifier.

22. The method of claim 15, wherein the association request is for an initial association with the location server or is for an association update with the location server and the association request includes a routing identifier for the location server received in a previous association with the location server.

23. The method of claim 15, further comprising:
receiving a disassociation request from the location server indicating at least one of new conditions for performing association updates with the location server, routing identifiers for one or more additional location servers with which the PRU is to perform separate association, a disassociation of the PRU with the location server.

24. A positioning reference unit (PRU) for supporting positioning in a wireless network, the PRU comprising:
one or more transceivers;
one or more memories; and
one or more processors communicatively coupled with the one or more transceivers and the one or more memories, wherein the one or more processors are configured to:
send an association request to a location server via the one or more transceivers; and
receive an association response from the location server via the one or more transceivers, the association response indicating an acceptance of association and conditions for performing another association with the location server or the association response indicating a rejection of the association, wherein the association response further:
- indicates a correlation identifier to identify the location server and PRU if the PRU is authenticated
- provides routing identifiers for one or more additional location servers with which the PRU is to perform separate association if the PRU is authenticated,
- provides a routing identifier for a different location server with which the PRU is to associate if the PRU is not authenticated, or
- some combination thereof.

25. The PRU of claim 24, wherein the one or more processors are further configured to send an indication of the location server with the association request, the indication of the location server used by an AMF to determine the location server and route the association request to the location server.

26. The PRU of claim 24, wherein the one or more processors are further configured to include, in the association request, an identification of the PRU, authentication information, or both, for authentication by the location server.

27. The PRU of claim 24, wherein the one or more processors are further configured to:
- receive an authentication challenge from the location server; and
- send an authentication response to the location server.

28. The PRU of claim 24, wherein the one or more processors are further configured to receive a disassociation request from the location server indicating:
- new conditions for performing association updates with the location server,
- routing identifiers for one or more additional location servers with which the PRU is to perform separate association,
- a disassociation of the PRU with the location server, or
- some combination thereof.

* * * * *